(12) United States Patent
Yin et al.

(10) Patent No.: US 12,489,926 B2
(45) Date of Patent: Dec. 2, 2025

(54) GUIDED FILTER USAGE

(71) Applicants: Beijing Bytedance Network Technology Co., Ltd., Beijing (CN); Bytedance Inc., Los Angeles, CA (US)

(72) Inventors: Wenbin Yin, Beijing (CN); Li Zhang, San Diego, CA (US); Kai Zhang, San Diego, CA (US); Yang Wang, Beijing (CN); Hongbin Liu, Beijing (CN)

(73) Assignees: BEIJING BYTEDANCE NETWORK TECHNOLOGY CO., LTD., Beijing (CN); BYTEDANCE INC., Los Angeles (CA)

( * ) Notice: Subject to any disclaimer, the term of this patent is extended or adjusted under 35 U.S.C. 154(b) by 71 days.

(21) Appl. No.: 18/485,522

(22) Filed: Oct. 12, 2023

(65) Prior Publication Data
US 2024/0040116 A1   Feb. 1, 2024

Related U.S. Application Data

(63) Continuation of application No. PCT/CN2022/086248, filed on Apr. 12, 2022.

(30) Foreign Application Priority Data

Apr. 12, 2021   (WO) ............... PCT/CN2021/086534

(51) Int. Cl.
*H04N 19/82* (2014.01)
*H04N 19/117* (2014.01)
(Continued)

(52) U.S. Cl.
CPC .......... *H04N 19/82* (2014.11); *H04N 19/117* (2014.11); *H04N 19/126* (2014.11);
(Continued)

(58) Field of Classification Search
CPC ............................ H04N 19/82; H04N 19/117
(Continued)

(56) References Cited

U.S. PATENT DOCUMENTS

2014/0146875 A1* 5/2014 Chong ................. H04N 19/196
375/240.02
2019/0052882 A1   2/2019 Barroux
(Continued)

FOREIGN PATENT DOCUMENTS

CN            105306957 A      2/2016
CN            111314711 A      6/2020
(Continued)

OTHER PUBLICATIONS

Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
(Continued)

*Primary Examiner* — Amir Shahnami
(74) *Attorney, Agent, or Firm* — Conley Rose, P.C.

(57) ABSTRACT

A mechanism for processing video data is disclosed. A conversion is performed between a visual media data including a plurality of video units and a bitstream. A guided filter is applied to samples in the video units. The guided filter is applied at a post decoding stage, such as in an in-loop filtering process.

19 Claims, 12 Drawing Sheets

(51) Int. Cl.
  *H04N 19/126* (2014.01)
  *H04N 19/132* (2014.01)
  *H04N 19/70* (2014.01)
  *H04N 19/80* (2014.01)

(52) U.S. Cl.
  CPC .......... *H04N 19/132* (2014.11); *H04N 19/70* (2014.11); *H04N 19/80* (2014.11)

(58) Field of Classification Search
  USPC .................................................. 375/240.02
  See application file for complete search history.

(56) References Cited

U.S. PATENT DOCUMENTS

| | | | |
|---|---|---|---|
| 2019/0116359 A1 | 4/2019 | Dong | |
| 2019/0306534 A1* | 10/2019 | Zhang | H04N 19/117 |
| 2019/0379913 A1 | 12/2019 | Sun | |
| 2020/0162741 A1 | 5/2020 | Byun | |
| 2020/0236356 A1 | 7/2020 | Bordes | |
| 2021/0235078 A1 | 7/2021 | Hu | |

FOREIGN PATENT DOCUMENTS

| | | | |
|---|---|---|---|
| WO | 2018097700 A1 | 5/2018 | |
| WO | 2021052453 A1 | 3/2021 | |

OTHER PUBLICATIONS

Retrieved from the internet: https://vcgit.hhi.fraunhofer.de/jvet-u-ee2/VVCSoftware_VTM/-/tree/VTM-11.2, Jan. 31, 2024.

He, K., et al., "Guided Image Filtering," IEEE Transactions on Pattern Analysis and Machine Intelligence, vol. 35, No. 6, Jun. 2013, 15 pages.

Li, Z., et al., "Weighted Guided Image Filtering," IEEE Transactions on Image Process, vol. 24, No. 1, Jan. 2015, 10 pages.

Kou, F., et al., "Gradient Domain Guided Image Filtering," IEEE Transactions on Image Process, vol. 24, No. 11, Aug. 2015, 13 pages.

Tomasi, C., et al., "Bilateral Loop Filter in Combination with SAO," in proceeding of IEEE Picture Coding Symposium (PCS), Nov. 2019, 8 pages.

Document: JVET-V0104-v3, Yin, W., et al., "EE2-related: TU-level adaptive self-guided filter," Joint Video Experts Team (JVET) of ITU-T SG 16 WP 3 and ISO/IEC JTC 1/SC 29/WG 11 22nd Meeting: Teleconference Apr. 20-28, 2021, 7 pages.

International Search Report from PCT Patent Application No. PCT/CN2022/086237 dated Jul. 8, 2022, 10 pages.

International Search Report from PCT Patent Application No. PCT/CN2022/086248 dated Jul. 7, 2022, 10 pages.

Non-Final Office Action from U.S. Appl. No. 18/484,899 dated Feb. 27, 2025, 19 pages.

* cited by examiner

GUIDED FILTER USAGE

CROSS-REFERENCE TO RELATED APPLICATIONS

This patent application is a continuation of International Application No. PCT/CN2022/086248 filed on Apr. 12, 2022, which claims the priority to and benefits of International Application No. PCT/CN2021/086534 filed on Apr. 12, 2021. All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: performing a conversion between a visual media data comprising a plurality of video units and a bitstream; and applying a guided filter to samples in the video units, wherein the guided filter is applied at a post decoding stage.

Optionally, in any of the preceding aspects, another implementation of the aspect provides that the guided filter is applied to prediction samples prior to reconstruction by application of residual data.

Optionally, in any of the preceding aspects, another implementation of the aspect provides that the guided filter is applied to reconstructed samples.

Optionally, in any of the preceding aspects, another implementation of the aspect provides that the guided filter is applied as part of an in-loop filter.

Optionally, in any of the preceding aspects, another implementation of the aspect provides that the guided filter is applied prior to a deblocking filter.

Optionally, in any of the preceding aspects, another implementation of the aspect provides that the guided filter is applied after a deblocking filter and prior to a sample adaptive offset (SAO) filter.

Optionally, in any of the preceding aspects, another implementation of the aspect provides that the guided filter is applied after a sample adaptive offset (SAO) filter and prior to an adaptive loop filter (ALF).

Optionally, in any of the preceding aspects, another implementation of the aspect provides that the guided filter is applied prior to a bilateral filter (BF) and in parallel with a sample adaptive offset (SAO) filter.

Optionally, in any of the preceding aspects, another implementation of the aspect provides that the guided filter classifies the video units into a plurality of video unit groups and applies different parameters to samples in each of the video unit groups.

Optionally, in any of the preceding aspects, another implementation of the aspect provides that the guided filter classifies the video units into the plurality of video unit groups based on statistical information related to each of the video units.

Optionally, in any of the preceding aspects, another implementation of the aspect provides that the statistical information includes a unit mean of the video unit, a variance of the video unit, a comparison of video unit values to a threshold, a dimension of the video unit, or combinations thereof.

Optionally, in any of the preceding aspects, another implementation of the aspect provides that the video unit is a coding tree unit (CTU), a coding tree block (CTB), a coding unit (CU), or a coding block (CB).

Optionally, in any of the preceding aspects, another implementation of the aspect provides that the guided filter classifies the samples into a plurality of sample groups and applies different parameters to samples in each of the sample groups.

Optionally, in any of the preceding aspects, another implementation of the aspect provides that the guided filter employs a window, and wherein the guided filter classifies the samples into the plurality of sample groups based on statistical information related to samples within the window.

Optionally, in any of the preceding aspects, another implementation of the aspect provides that the statistical information includes a mean value of samples within the window, a variance of samples within the window, a gradient within the window, or combinations thereof.

Optionally, in any of the preceding aspects, another implementation of the aspect provides that the guided filter comprises a window shape, and wherein the window shape is a square, a cross, a diamond, a symmetrical shape, an asymmetrical shape, or combinations thereof.

Optionally, in any of the preceding aspects, another implementation of the aspect provides that the bitstream comprises a syntax element describing a usage of the guided filter, and wherein the syntax element is set during a rate distortion optimization (RDO) based on: slice data, coding tree unit (CTU) data, coding unit (CU) data, transform unit (TU) data, or combinations thereof.

Optionally, in any of the preceding aspects, another implementation of the aspect provides that the bitstream comprises a syntax element describing a usage of the guided filter, the syntax element located in a sequence header, a picture header, a sequence parameter set, a video parameter set, decoding parameter set, a decoding capability information, a picture parameter set, an adaptation parameter set, a slice header, a tile group header, or combinations thereof.

Optionally, in any of the preceding aspects, another implementation of the aspect provides that the bitstream comprises a syntax element describing a usage of the guided filter, the syntax element located in a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a subpicture, or combinations thereof.

Optionally, in any of the preceding aspects, another implementation of the aspect provides that the guided filter is allowed or disallowed for each video unit based on coded information for a corresponding video unit, the coded information including a block size, a color format, a tree partitioning, color component, a slice type, a picture type, or combinations thereof.

Optionally, in any of the preceding aspects, another implementation of the aspect provides that the conversion includes encoding the video units into the bitstream.

Optionally, in any of the preceding aspects, another implementation of the aspect provides that the conversion includes decoding the video units from the bitstream.

A second aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

A fourth aspect relates to a non-transitory computer-readable recording medium storing a bitstream of a video which is generated by a method performed by a video processing apparatus, wherein the method comprises: determining to apply a guided filter to samples in video units, wherein the guided filter is applied at a post decoding stage; and generating the bitstream based on the determining.

A fifth aspect relates to a method for storing bitstream of a video comprising: determining to apply a guided filter to samples in video units, wherein the guided filter is applied at a post decoding stage; generating the bitstream based on the determining; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
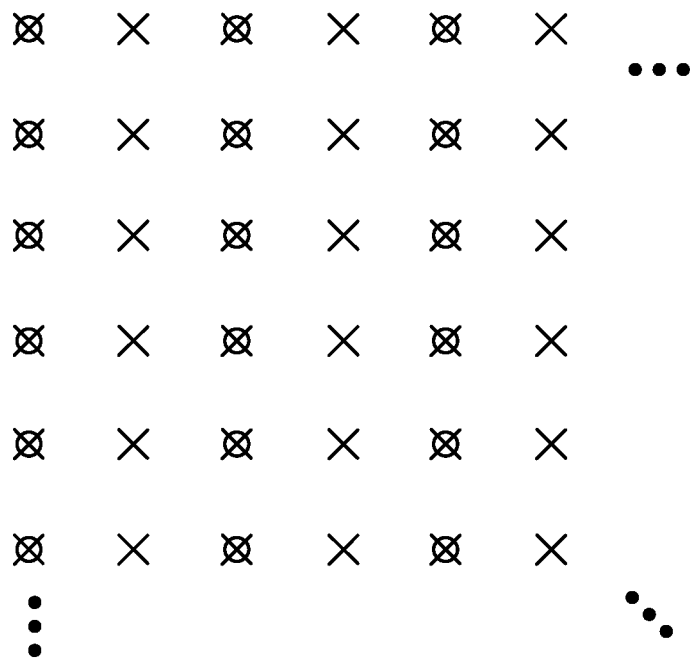
FIG. 1 is a schematic diagram of an example of chroma subsampling.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure is related to video coding technologies. Specifically, this disclosure is related to in-loop filter and other coding tools in image/video coding. The concepts discussed herein may be applied individually or in various combination, to any video coding standard and/or video codec, such as like High Efficiency Video Coding (HEVC) and Versatile Video Coding (VVC).

The present disclosure includes the following abbreviations. Adaptive color transform (ACT), coded picture buffer (CPB), clean random access (CRA), coding tree unit (CTU), coding unit (CU), coded video sequence (CVS), decoded picture buffer (DPB), decoding parameter set (DPS), general constraints information (GCI), high efficiency video coding, also known as Rec. ITU-T H.265|ISO/IEC 23008-2, (HEVC), joint exploration model (JEM), motion constrained tile sets (MCTS), network abstraction layer (NAL), output layer set (OLS), picture header (PH), picture parameter set (PPS), profile, tier, and level (PTL), prediction unit (PU), reference picture resampling (RPR), raw byte sequence payload (RBSP), supplemental enhancement information (SEI), slice header (SH), sequence parameter set (SPS), video coding layer (VCL), video parameter set (VPS), video usability information (VUI), and versatile video coding, also known as Rec. ITU-T H.266|ISO/IEC 23090-3, (VVC), VVC test model (VTM), transform unit (TU), coding unit (CU), deblocking filter (DF), sample adaptive offset (SAO), adaptive loop filter (ALF), coding block flag (CBF), quantization parameter (QP), rate distortion optimization (RDO).

Video coding standards have evolved primarily through the development of the International Telecommunication Union (ITU) Telecommunications Standardization Sector (ITU-T) and ISO/International Electrotechnical Commission (IEC) standards. The ITU-T produced H.261 and H.263, ISO/IEC produced Motion Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the further video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM). The JVET initiated a coding standard targeting at 50% bitrate reduction as compared to HEVC. The is named Versatile Video Coding (VVC), and is associated with a VVC test model. As there are continuous efforts contributing to VVC standardization, VVC is continuously updated with additional techniques. The VVC working draft and test model VTM are then updated accordingly.

Color space and chroma subsampling is now discussed. Color space, also known as the color model (or color system), is a mathematical model, which describes the range of colors as tuples of numbers, such as 3 or 4 values or color components (e.g., red, green, and blue). A color space can be seen as an elaboration of the coordinate system and subspace. For video compression, most video codecs employ luma, blue difference chroma, red difference chroma (YCbCr) and red, green, blue, (RGB) color spaces. YCbCr, Y'CbCr, Y parallel blue (Pb) parallel red (Pr), and Y'PbPr, also written as YCBCR or Y'CBCR, is a family of color spaces used as a part of the color image pipeline in video and digital photography systems. Y' is the luma component and Cb and Cr are the blue-difference and red-difference chroma components. Y' (with prime) is distinguished from Y, which is luminance, meaning that light intensity is nonlinearly encoded based on gamma corrected RGB primaries.

Chroma subsampling is a practice of encoding images by implementing less resolution for chroma information than for luma information. This takes advantage of the human visual system's lower acuity for color differences than for luminance. In 4:4:4 component format, each of the three Y'CbCr components have the same sample rate, and thus there is no chroma subsampling. This scheme is sometimes used in high-end film scanners and cinematic postproduction.

FIG. 1 is a schematic diagram 100 of an example of chroma subsampling. In 4:2:2 component format, the two chroma components are sampled at half the sample rate of luma. Specifically, the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is schematic diagram 100. Schematic diagram 100 depicts nominal vertical and horizontal locations of 4:2:2 luma and chroma samples in a picture.

In 4:2:0 format, the horizontal sampling is doubled compared to 4:1:1, but the Cb and Cr channels are only sampled on each alternate line in this scheme. Accordingly, the vertical resolution is halved. The data rate is thus the same. Cb and Cr are each subsampled at a factor of two both horizontally and vertically. There are three variants of 4:2:0 schemes, each of which has different horizontal and vertical siting. In MPEG version two (MPEG-2), Cb and Cr are cosited horizontally. In this scheme, Cb and Cr are sited between pixels in the vertical direction (sited interstitially).

In joint photographic experts group (JPEG), JPEG file interchange format (JFIF), H.261, and MPEG-1, Cb and Cr are sited interstitially, halfway between alternate luma samples. In 4:2:0 digital video (DV), Cb, and Cr are co-sited in the horizontal direction. In the vertical direction, they are co-sited on alternating lines.

As shown in table 1, chroma subsampling width (SubWidthC) and chroma subsampling height (SubHeightC) values are derived from a chroma format identification code (chroma_format_idc) and a separate color plane flag (separate_colour_plane_flag). A coding flow of an example video codec is now discussed.

Figure 13:
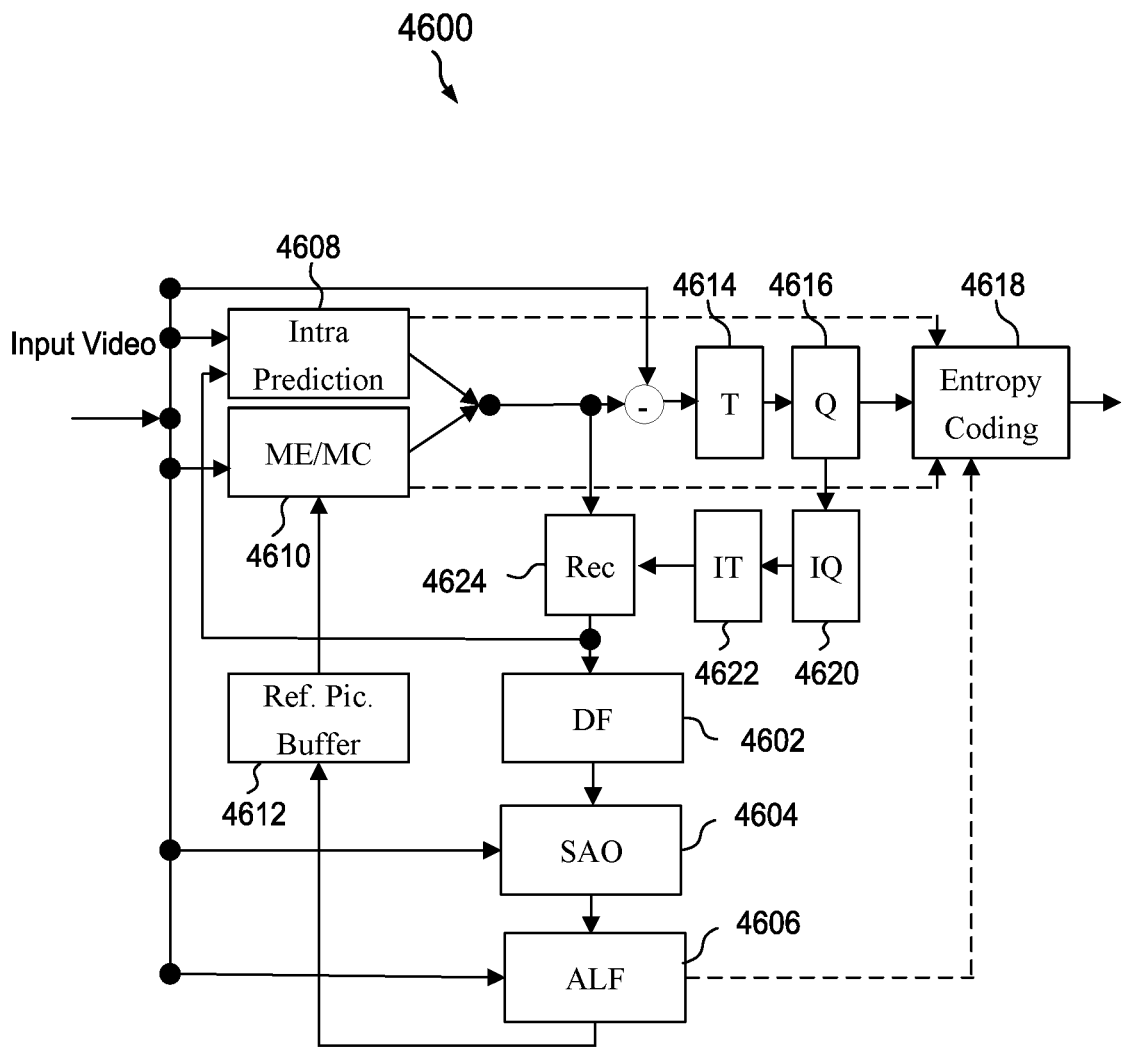
FIG. 13 is a schematic diagram of an example encoder.

FIG. 13 is now referenced. FIG. 13 shows an example of encoder 4600 as used in VVC. VVC contains three in-loop filtering blocks: deblocking filter (DF), sample adaptive offset (SAO) and ALF. DF uses predefined filters. SAO and ALF utilize the original samples of the current picture to reduce the mean square errors between the original samples and the reconstructed samples. This is done by adding an offset and by applying a finite impulse response (FIR) filter, respectively. Coded side information signaling of the offsets and filter coefficients is also employed. ALF is located at the last processing stage of each picture and can be regarded as a tool to catch and fix artifacts created by the previous stages.

Figure 2:
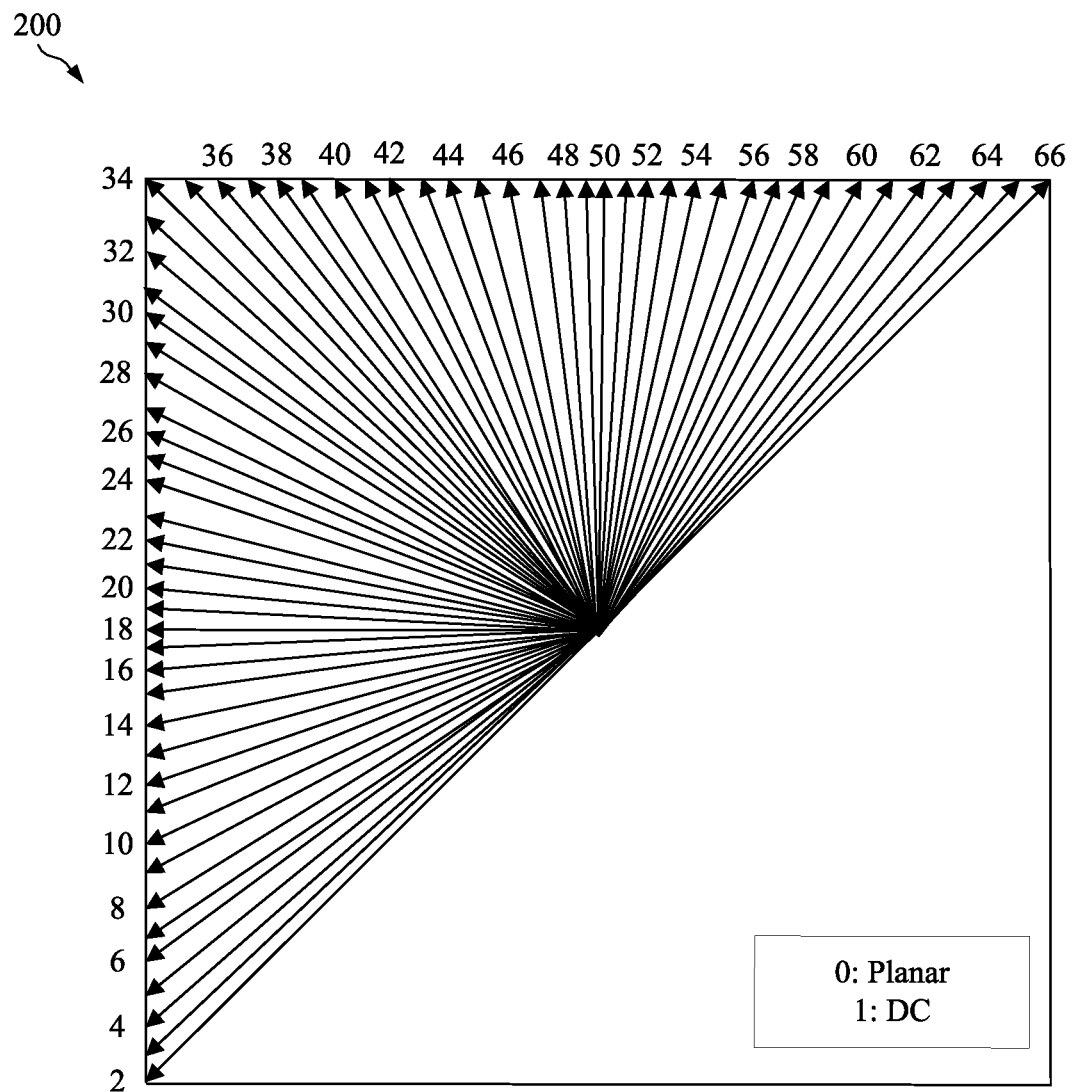
FIG. 2 is a schematic diagram of an example intra prediction modes.

FIG. 2 is a schematic diagram 200 of an example intra prediction modes. Intra Prediction is now discussed. To capture the arbitrary edge directions presented in natural video, the number of directional intra modes is extended from 33 in HEVC to 65 in VVC. These denser directional intra prediction modes apply for all block sizes and for both luma and chroma intra predictions. Angular intra prediction directions are defined from 45 degrees to −135 degrees in clockwise direction as shown in schematic diagram 200. In VTM, several angular intra prediction modes are adaptively replaced with wide-angle intra prediction modes for non-square blocks. The replaced modes are signaled and remapped to the indexes of wide angular modes after parsing. The total number of intra prediction modes is 67 and is unchanged. Further, the intra mode coding is unchanged.

In the HEVC, every intra-coded block has a square shape and the length of each side is a power of two. Thus, no division operations are used to generate an intra-predictor using direct current (DC) mode. In VVC, blocks can have a rectangular shape that necessitates the use of a division operation per block in the general case. To avoid division operations for DC prediction, only the longer side is used to compute the average for non-square blocks.

For each inter-predicted CU, motion parameters including motion vectors, reference picture indices, a reference picture list usage index, and additional information are used for inter-predicted sample generation in VVC. The motion parameter can be signaled in an explicit or implicit manner. When a CU is coded with skip mode, the CU is associated with one PU and has no significant residual coefficients, no coded motion vector delta, and no reference picture index. A merge mode is specified whereby the motion parameters for the current CU are obtained from neighbouring CUs. This includes spatial and temporal candidates, as well as additional schedules introduced in VVC. The merge mode can be applied to any inter-predicted CU, and is not only used for skip mode. The alternative to merge mode is the explicit transmission of motion parameters. In this case, a motion

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 | vector, a corresponding reference picture index for each reference picture list, a reference picture list usage flag, and other information are signaled explicitly for each CU.

The deblocking filter is now discussed. Deblocking filtering is an in-loop filter in a video codec. In VVC, the deblocking filtering process is applied on CU boundaries, transform subblock boundaries, and prediction subblock boundaries. The prediction subblock boundaries include the prediction unit boundaries introduced by the Subblock based Temporal Motion Vector prediction (SbTMVP) and affine modes. The transform subblock boundaries include the transform unit boundaries introduced by Subblock transform (SBT) and Intra Sub-Partitions (ISP) modes, as well as transforms due to implicit splits of large CUs. The processing order of the deblocking filter is defined as horizontal filtering for vertical edges for the entire picture first. This is followed by vertical filtering for horizontal edges. This specific order enables either multiple horizontal filtering or vertical filtering processes to be applied in parallel threads. Such filtering can still be implemented on a CTB-by-CTB basis with only a small processing latency.

SAO filters are now discussed. SAO is applied to the reconstructed signal after the deblocking filter by using offsets specified for each CTB by the encoder. The video encoder first makes the decision on whether or not the SAO process is to be applied for current slice. If SAO is applied for the slice, each CTB is classified as one of five SAO types as shown in table 2. The SAO is employed to classify pixels into categories and reduce the distortion by adding an offset to pixels of each category. SAO operation includes edge offset (EO), which uses edge properties for pixel classification in SAO type 1 to 4. SAO also includes a band offset (BO) which uses pixel intensity for pixel classification in SAO type 5. Each applicable CTB has SAO parameters including a SAO merge left flag (sao_merge_left_flag), a SAO merge up flag (sao_merge_up_flag), SAO type, and four offsets. If sao_merge_left_flag is equal to 1, the current CTB reuses the SAO type and offsets of the CTB to the left. If sao_merge_up_flag is equal to 1, the current CTB reuses SAO type and offsets of the CTB above. Table 2 is a specification of SAO types.

TABLE 2

| SAO type | sample adaptive offset type to be used | Number of categories |
| --- | --- | --- |
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

The adaptive loop filter is now discussed. Adaptive loop filtering for video coding is used to minimize the mean square error between original samples and decoded samples by using a Wiener-based adaptive filter. The ALF is located at the last processing stage for each picture and can be regarded as a tool to catch and correct artifacts from previous stages. The suitable filter coefficients are determined by the encoder and explicitly signaled to the decoder. In order to achieve better coding efficiency, especially for high resolution videos, local adaptation is used for luma signals by applying different filters to different regions or blocks in a picture. In addition to filter adaptation, filter on/off control at coding tree unit (CTU) level is also helpful for improving coding efficiency. Syntax-wise, filter coefficients are sent in a picture level header called an adaptation parameter set. Filter on/off flags of CTUs are interleaved at CTU level in the slice data. This syntax design not only supports picture level optimization but also achieves a low encoding latency.

A bilateral image filter is now discussed. The bilateral image filter is a nonlinear filter that smooths the noise while preserving edge structures. Bilateral filtering is a technique to make the filter weights decrease not only with the distance between the samples, but also with increasing difference in intensity. In this way, over-smoothing of edges can be ameliorated. A weight is defined as:

$$w(\Delta x, \Delta y, \Delta I) = e^{-\frac{\Delta x^2 + \Delta y^2}{2\sigma_d^2} - \frac{\Delta I^2}{2\sigma_r^2}},$$

where $\Delta x$ and $\Delta y$ is the distance in the vertical and horizontal and $\Delta I$ is the difference in intensity between the samples. The edge-preserving de-noising bilateral filter adopts a low-pass Gaussian filter for both the domain filter and the range filter. The domain low-pass Gaussian filter gives higher weight to pixels that are spatially close to the center pixel. The range low-pass Gaussian filter gives higher weight to pixels that are similar to the center pixel. Combining the range filter and the domain filter, a bilateral filter at an edge pixel becomes an elongated Gaussian filter that is oriented along the edge and is greatly reduced in gradient direction. For this reason, the bilateral filter can smooth the noise while preserving edge structures.

A bilateral filter in video coding is now discussed. The bilateral filter acts as a loop filter in parallel with the sample adaptive offset (SAO) filter. Both the bilateral filter and SAO act on the same input samples. Each filter produces an offset. These offsets are then added to the input sample to produce an output sample that goes to the next stage after clipping. The spatial filtering strength $\sigma_d$ is determined by the block size, with smaller blocks filtered more strongly. The intensity filtering strength $\sigma_r$ is determined by the quantization parameter. Stronger filtering is used for higher QPs. Only the four closest samples are used, so the filtered sample intensity $I_F$ can be calculated as:

$$I_F = I_C + \frac{w_A \Delta I_A + w_B \Delta I_B + w_L \Delta I_L + w_R \Delta I_R}{w_C + w_A + w_B + w_L + w_R}$$

where $I_C$ denotes the intensity of the center sample, $\Delta I_A = I_A - I_C$ the intensity difference between the center sample and the sample above and, $\Delta I_B$, $\Delta I_L$ and $\Delta I_R$ denote the intensity difference between the center sample and that of the sample below, to the left, and to the right respectively.

A guided image filter is now discussed. Guided Image Filter (GIF) is a global optimization image filter for edge-persevering image smoothing and image detail enhancement. Derived from a local linear model, the guided filter computes the filtering output by considering the content of a guidance image. The guidance image can be the input image itself or another different image. The guided filter can be used as an edge-preserving smoothing operator like the bilateral filter, but the guided filter has better behaviors near edges. The guided filter is also a more generic concept beyond smoothing. The guided filter can transfer the structures of the guidance image to the filtering output. This allows additional filtering applications like dehazing and guided feathering. The guided filter has a fast and non-approximate linear time algorithm, that is applied regardless of the kernel size and the intensity range. The guided filter is both effective and efficient in a great variety of computer vision and computer graphics applications, including edge-aware smoothing, detail enhancement, high dynamic range (HDR) compression, image matting/feathering, dehazing, joint upsampling, etc.

Several guided image filter based image filtering schemes may further improve the performance of global image smoothing. For example, weight guided image filter (WGIF) may reduce the halo artifacts of the guided image filter (GIF). An edge aware factor is introduced to the constraint term of the GIF. The factor makes better preserves edges in the resulting images and thus reduces the halo artifacts. In the gradient domain guided image filter (GGIF), a gradient domain guided image filter incorporates an explicit first-order edge-aware constraint. The GGIF is based on local optimization, and the cost function is composed of a zeroth order data fidelity term and a first order regularization term. The regularization term includes an explicit edge aware constraint, which is different from the regularization in both of the GIF and the WGIF.

The following are example technical problems solved by disclosed technical solutions. The designs for in-loop filter result in reconstructed video units that need further smoothing. This is because the ringing artifacts caused by transform and quantization are not completely removed by example in-loop filters.

Disclosed herein are mechanisms to address one or more of the problems listed above. For example, the present disclosure includes a guided filter that removes ringing artifacts that are otherwise missed by the in-loop filter. The guided filter can be applied in various positions in the in-loop filter. In other examples, the guided filter can be applied as part of the sample reconstruction process (prior to in-loop filtering) and/or during post processing (after in-loop filtering is complete). The filter may apply a window to samples. The filter may then determine a mean value within the window. A weight is applied to the sample to be filtered, a weight is applied to the mean value within the window, and the weighted mean value is applied to the weighted sample. Various mechanisms for computing the weights are also disclosed. In some examples, samples and/or video units within the window can be sorted into different groups, and different filtering parameters (e.g., weights) can be applied to each group. The sorting can be performed based on statistical data within the window, such as mean, variance, gradient, etc. Accordingly, the filter may employ a window for sorting samples and a filter shape for applying the filter to those samples. The window and filter shape may be the same when grouping is not employed and may be a different area when grouping is employed. Video units may be padded prior to application of the guided filter. The size and shape of the guided filter and/or guided filter window can be predefined, derived on the fly, or signaled. The guided filter may be allowed for application or disallowed for application based on various conditions. Further, syntax related to the guided filter can be signaled at various levels within the bitstream. These and other aspects are described herein.

Figure 3:
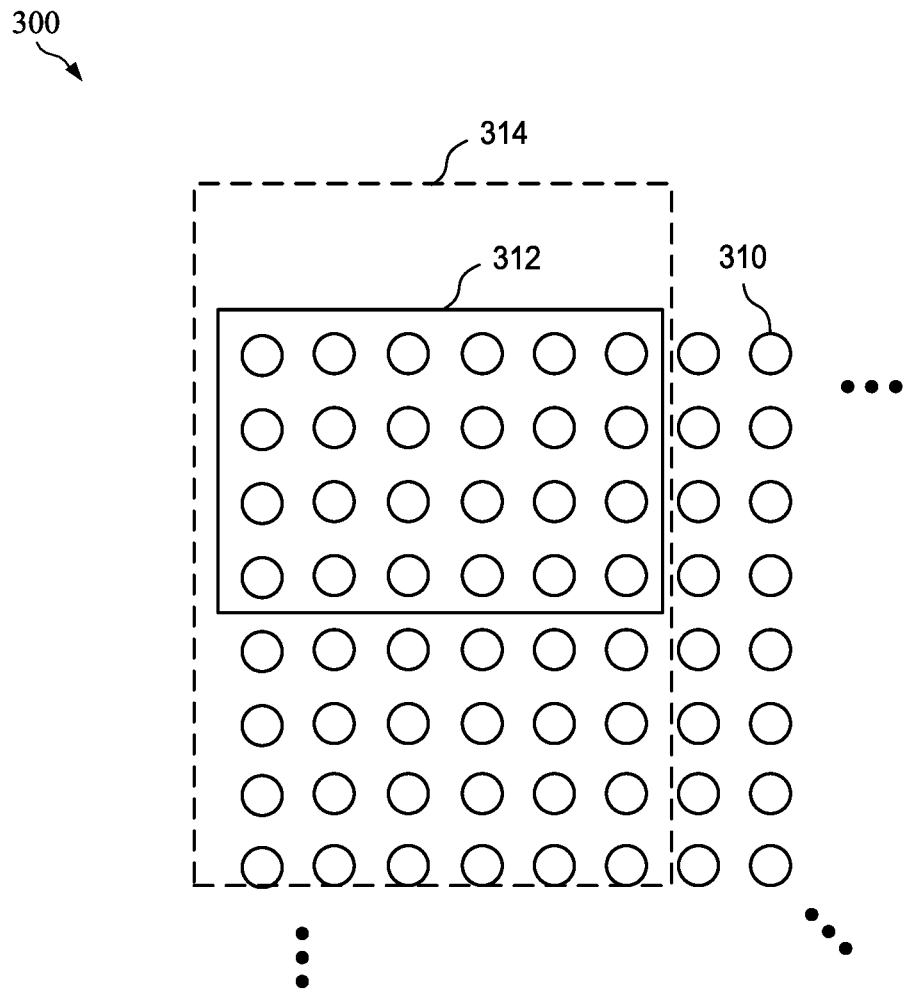
FIG. 3 is a schematic diagram of an example guided filter applied to samples in a video unit.

FIG. 3 is a schematic diagram 300 of an example guided filter applied to samples 310 in a video unit. A sample 310 is a pixel value. The video coding process splits pixel values into a color space, such as YCrCb and/or RGB. Accordingly, a sample 310 may include a luma component (light value) from a pixel, a chroma component (color value) for a pixel, or both depending on the context. Samples 310 can be partitioned into various video units, such as a sequence, a picture, a subpicture, a slice, a tile, a coding tree unit (CTU), a CTU row, a coding unit (CU), a prediction unit (PU), a transform unit (TU), a coding tree block (CTB), a prediction block (PB), a transform block (TB), and/or a color component of any of the forgoing. For example, samples 310 can be divided into CTUs, which can be partitioned into blocks, which is a general term that may include CUs, PUs, PBs, TBs, TUs, etc. Each current block is then coded by intra prediction and/or inter prediction by reference to one or more reference blocks. Any difference between the reference block and the current block is not coded by the prediction process. Such a difference is referred to as residual. A transform can be applied to compress the residual. Further, the residual can be quantized, which further compresses the residual but loses data. At the encoder, the blocks are then decoded and reconstructed for use as reference blocks for subsequent pictures. At the decoder, the blocks are decoded and reconstructed for display. In either case, block based coding scheme often produce artifacts, which are errors in sample values when the samples 310 are reconstructed. Filters can be applied to mitigate such artifacts. For example, the filters can be designed to adjust the values of the samples 310 in order to counteract expected and/or observed coding errors. For example, a filter may be applied consistently to all samples and/or can be applied when certain conditions occur. In another example, an encoder can reconstruct a video unit, review the video unit for errors, determine to apply the filter, and then signal filter usage to the decoder via the bitstream.

The present disclosure relates specifically to a guided filter. The guided filter is designed to address ringing artifacts created by the transform and quantization process. A ringing artifact is a false signal that occurs at a transition point, such as a block edge. A ringing artifact may appear as an extra band along a block edge. The extra band is an echo of the real edge. The guided filter applies computations to the samples 310 to correct such artifacts.

The guided filter may comprise a filter window 314 and a filter 312. The filter window 314 indicates all samples 310 the filter considers when performing computations. The filter 312 indicates all samples 310 to which the computation is applied. In some examples, the filter window 314 covers more samples than the filter 312. In other cases, the filter window 314 covers the same set of samples 310 as the filter 312. For example, the filter window 314 may be used to create a plurality of groups containing different video units and/or containing different samples 310. The filter 312 can then be applied to each group in the window 314, but each group may employ different filtering parameters. The groups may be assigned based on various statistical information related to the video units and/or samples 310. For example, the video units and/or samples 310 can be assigned to groups based on video unit mean value, video unit variance, comparison of the video unit statistics to a class index or other threshold, a width and/or height of the video unit, a mean value of samples 310 within a window 314, a variance within the window 314, a gradient (minimum, maximum, or mean) within the widow 314, etc. In another example, a single group is used, in which case the filter 312 and the filter window 312 are the same size and cover the sample set of samples 310.

In an example, a video unit can be classified into a group based on a unit mean value determined according to:

$$S = w_{unit} \times h_{unit}$$

$$\text{mean}_{unit} = \left(\sum_{i=0}^{i=S-1} p_i\right) / S$$

where $p_i$ is the sample located at i position inside the video unit, s is video unit size, $w_{unit}$ and $h_{unit}$ stand for width and height of the video unit, respectively, and $\text{mean}_{unit}$ is the unit mean value.

In an example, a video unit can be classified into a group based on unit variance determined according to:

$$corr_{unit} = \left(\sum_{i=0}^{i=S-1} p_i \times p_i\right) / S$$

$$var_{unit} = corr_{unit} - \text{mean}_{unit}^2$$

where $p_i$ is the sample located at i position inside the video unit, s is video unit size, $corr_{unit}$ and $\text{mean}_{unit}$ stand for unit correspondence and mean unit value, respectively, and $var_{unit}$ is unit variance.

In an example, a video unit can be classified into a group based on a fixed threshold value determined according to:

$$\text{index}_{unit} = \lfloor \text{info}_{unit} / T_{block\_class} \rfloor$$

where 0≤$\text{index}_{unit}$, $\text{info}_{unit}$ stands for the corresponding statistical information, and $T_{block\_class}$ is the threshold.

In an example, a video unit can be classified into a group based on a plurality of fixed threshold values determined according to:

$$\text{index}_{unit} = 0 \text{ when } (0 \leq \text{info}_{unit} < T_1)$$
$$...$$
$$\text{index}_{unit} = N_{unit} - 2 \text{ when } (T_{N-2} \leq \text{info}_{unit} < T_{N-1})$$
$$\text{index}_{unit} = N_{unit} - 1 \text{ when } (T_{N-1} \leq \text{info}_{unit})$$

where 0≤$\text{index}_{unit}$<$N_{unit}$, $\text{info}_{unit}$ stands for the corresponding statistical information, and $T_N$ is a series of N thresholds.

The filter 312 and filter window 314 are depicted as rectangles for simplicity, but other shapes may be employed, such as a square, a cross, a diamond, a symmetrical shape, an asymmetrical shape, or combinations thereof. The filter 312 modifies the samples 310 by applying a statistical computation to the samples 310 within the filter 312 and/or filter window 314. In an example, the statistical computation may include determining a filter sample by applying a weight to a sample 310 at the center of the window 314, applying a weight to a mean of the samples 310 in the window 314, and adding the weighted sample to the weighted mean.

For example, the statistical computation can be determined according to:

$$\text{sample}_{filtered} = a \times \text{sample}_{center} + b \times \text{mean}_{win}$$

where $\text{sample}_{filtered}$ is a filtered sample, a and b are weights, $\text{sample}_{center}$ is a center sample in the video unit, and $\text{mean}_{win}$ is a mean value within the window. The weights a and b can be computed by employing several different mechanisms.

In an example, weight a and weight b are determined according to:

$$a = \frac{var_{win}}{var_{win} + eps_1},$$

$$b = T_1 - a$$

where $eps_1$ is a filtering strength parameter, $T_1$ is a weight control parameter, and $var_{win}$ is a variance within the window.

In another example, weight a and weight b are determined according to:

$$tau_2 = (var_{win} + e_2)/(var_{win_{mean}} + e_2)$$

$$a = var_{win}/(var_{win} + eps_2/tau_2), \text{ and}$$

$$b = T_2 - a$$

where $var_{win}$ is a variance within the window, $e_2$ is an adaptability parameter, $var_{win_{mean}}$ is a mean of $var_{win}$, $eps_2$ is a filtering strength parameter, $T_2$ is a weight control parameter, and $tau_2$ is a weight parameter.

In another example, weight a and weight b are determined according to:

$$tau_3 = (var_{win} + e_3)/(var_{win_{mean}} + e_3),$$

$$eta_3 = k_3/(var_{win_{mean}} - var_{win_{min}}),$$

$$gamma_3 = 1 - \frac{T_3}{1 + e^{eta_3 \times (var_{win} - var_{win_{mean}})}},$$

$$a = \frac{var_{win} + \frac{eps_3}{tau_3} \times gamma_3}{var_{win} + \frac{eps_3}{tau_3}}, \text{ and}$$

$$b = T_4 - a$$

where $var_{win}$ is a variance within the window, $e_3$ is an adaptability parameter, $var_{win_{mean}}$ is a mean of $var_{win}$, $tau_3$ is a weight parameter, $eta_3$ is a filtering parameter, $k_3$ is a filtering strength parameter, $var_{win_{min}}$ is minimum of $var_{win}$, $gamma_3$ is a filtering parameter, $T_3$ is a filtering parameter, $eps_3$ is a filtering strength parameter, and $T_4$ is a filtering parameter.

In an example, $var_{win}$ is determined according to:

$$var_{win} = corr_{win} - \text{mean}_{win}^2,$$

$$corr_{win} = \left(\sum_{i=0}^{i=S_{total}-1} p_i^2\right) / S_{total}, \text{ and}$$

$$\text{mean}_{win} = \left(\sum_{i=0}^{i=S_{total}-1} p_i\right) / S_{total}$$

where $S_{total}$ is a total number of samples within the window, $\text{mean}_{win}$ is a mean value within the window, $corr_{win}$ is a variance within the window, and $p_i$ is a set of all samples within the window.

In an example, weight a and weight b are refined according to:

$$a_{refine} = \sum_{i=0}^{i=total-1} a_i/s_{total}$$

$$b_{refine} = \sum_{i=0}^{i=total-1} b_i/s_{total}$$

where $a_{refine}$ is a refined weight a, $b_{refine}$ is a refined weight b, $S_{total}$ is a total number of samples within the window, and $a_i$ and $b_i$ represent a corresponding sample within the window.

In another example, the statistical computation is determined according to:

$$\text{sample}_{filtered} = \sum_{j=0}^{j=K_{total}-1} w_{shape_j} \times p_j$$

where $\text{sample}_{filtered}$ is a filtered sample, $K_{total}$ is the total number of samples inside a filter shape, $p_j$ is a sample at position j inside the filter shape, and $w_{shape_j}$ is a weight corresponding to $p_j$.

It should be noted that the samples 310 may be filtered in an unpadded state in some examples. In other examples, the samples 310 in a video unit may be padded prior to filtering, for example as discussed below. In addition, the guided filter can be allowed or disallowed from use for each video unit based on transform coefficients in a corresponding video unit, a color format in the corresponding video unit, quantization parameters in the corresponding video unit, dimensions in the corresponding video unit, a number of samples in the corresponding video unit, prediction information in the corresponding video unit, a reference index in the corresponding video unit, or combinations thereof.

Figure 4:
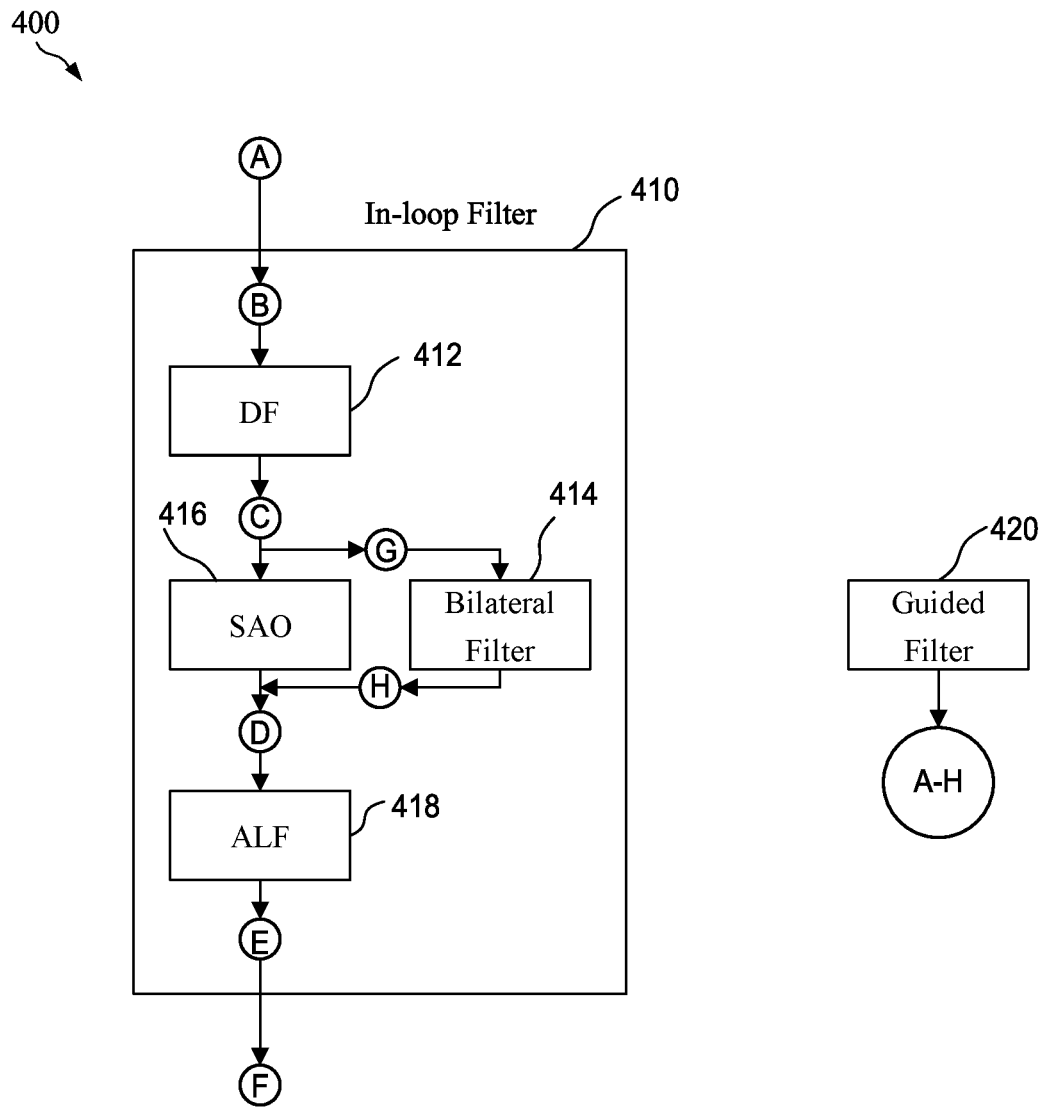
FIG. 4 is a schematic diagram of an example guided filter applied in conjunction with in-loop filtering.

FIG. 4 is a schematic diagram 400 of an example guided filter 420 applied in conjunction with in-loop filtering. An in-loop filter 410 may comprise a deblocking filter (DF) 412, a sample adaptive offset (SAO) filter 416, a bilateral filter 414, and an adaptive loop filter (ALF) 418. Such filters may be applied to video units in the order shown in schematic diagram 400. For example, a video unit can be reconstructed. The DF 412 is applied prior to the SAO filter 416. The bilateral filter 414 is applied in parallel to the SAO filter 416. The ALF 418 is applied after the SAO filter 416. The DF 412, the SAO filter 416, the bilateral filter 414, and the ALF 418 are as discussed herein above. The present disclosure addresses a guided filter 420, which may operate as discussed with respect to schematic diagram 300. As shown, the guided filter 420 can be applied at various positions within the in-loop filter 410. The guided filter 420 may also be applied prior to application of the in-loop filter 410 or after application of the in-loop filter. Possible positions of the guided filter 420 are denoted as positions A-H.

In position A, the guided filter may be applied before in-loop filtering. For example, the guided filter 420 may be applied to prediction results prior to application of residual to create reconstructed samples. The guided filter 420 may also be applied at position B as part of the in-loop filter 410 and before the DF 412. The guided filter 420 may also be applied at position C after the DF 412 and prior to SAO filter 416. The guided filter 420 may also be applied at position D after the SAO filter 416 and prior to the ALF 418. The guided filter 420 may also be applied at position E after the ALF 418. The guided filter 420 may also be applied at position G, which is after the DF 412, prior to the bilateral filter 414, and in parallel with the SAO filter 416. The guided filter 420 may also be applied at position H, which is after the bilateral filter 414, in parallel with the SAO filter 416, and prior to the ALF 418. The guided filter 420 may also be applied at position E as part of the in-loop filter 410 and after the ALF 418. Further, the guided filter 420 may also be applied in position F, which is after completion of the in-loop filtering. For example, the guided filter 420 may be applied in a post processing stage after application of the in-loop filter.

To solve the above problems, and others, methods as summarized below are disclosed. The items should be considered as examples to explain the general concepts and should not be interpreted in a narrow way. Furthermore, these items can be applied individually or combined in any manner.

EXAMPLE 1

In one example, a guided filter is employed to further modify the reconstructed samples/pixels of a video unit in addition to the deblocking filter (DF), sample adaptive offset filter (SAO), and adaptive loop filter (ALF) as used in VVC.

In one example, the video unit may refer to color component, sequence, picture, sub-picture, slice, tile, coding tree unit (CTU), CTU row, group of CTU, coding unit (CU), prediction unit (PU), transform unit (TU), coding tree block (CTB), coding block (CB), prediction block (PB), transform block (TB), and/or any other region that contains more than one sample or pixel. In one example, the reconstructed sample/pixel of the video unit may be dependent on the coded information of one or more regions, windows, and/or designed filter shapes, which contain the reconstructed sample/pixel.

In one example, the coded/statistical information (e.g., mean, variance, and/or block dimensions) may be used to generate the filtered sample and/or pixel by the guided filter. In one example, the coded and/or statistical information may be the mean value within a window. In one example, the mean value within a window may be calculated as follows:

$$\text{mean}_{win} = \left(\sum_{i=0}^{i=S_{total}-1} p_i\right)/S_{total}$$

where $S_{total}$ stands for the total number of samples inside the window.

In one example, the coded and/or statistical information may be the variance within a window. In one example, the variance within a window may be calculated as follows:

$\text{corr}_{win} = (\Sigma_{i=0}^{i=S_{total}-1} p_i^2)/S_{total}$, and $\text{var}_{win} = \text{corr}_{win} - \text{mean}_{win}^2$ where $\text{mean}_{win}$ is the mean value within the window and $S_{total}$ is the total number of samples inside the window.

In one example, the coded and/or statistical information may be the mean value within a designed filter shape. In one example, the coded and/or statistical information may be the variance value within a designed filter shape. In one example, the coded and/or statistical information may be the gradient information within a designed filter shape. In one example, the window shape of the guided filter may be a square, a diamond, or other shapes. In one example, the window shape may be a square. In one example, the window shape may be a cross. In one example, the window shape may be a diamond. In one example, the window shape may be symmetrical. In one example, the window shape may be asymmetrical.

In one example, indications of the window shape may be signaled or pre-defined or derived on-the-fly. In one example, the window size of the guided filter may be pre-defined, signaled, derived on-the-fly, or derived based on the decoded information. In one example, the designed filter shape of the guided filter may be a square, a diamond, or other shapes. In one example, the filter shape may be a square. In one example, the filter shape may be a cross. In one example, the filter shape may be a diamond. In one example, the filter shape may be symmetrical. In one example, the filter shape may be asymmetrical. In one example, the filter shape may be the same as the window shape. In an example, the filter shape may be different from the window shape. In one example, indications of the filter shape may be signaled, pre-defined, or derived on-the-fly.

In one example, the size of the designed filter shape may be pre-defined, signaled, derived on-the-fly, or derived based on the decoded information. In one example, a sample or pixel may be filtered and/or modified by the guided filter with utilization of coded and/or statistical information. In one example, the filtering result may be computed as a function of the sample to be filtered and the mean value of a window as follows:

$$\text{sample}_{filtered} = a \times \text{sample}_{center} + b \times \text{mean}_{win}$$

where $\text{sample}_{center}$ is the central sample/pixel inside the window, a and b are two weights used in filtering (e.g., $\text{sample}_{center}$ and $\text{sample}_{filtered}$ may be at the same position).

In one example, the weights used in filtering may be computed as follows:

$$a = \frac{\text{var}_{win}}{\text{var}_{win} + eps_1}, \text{ and}$$

$$b = T_1 - a$$

where $eps_1$ (e.g., $eps_1=50$) is a parameter that is used to control the filtering strength and $T_1$ (e.g., $T_1=1$) is a parameter that is used to control the weights.

In one example, the weights used in filtering may be computed as follows:

$$tau_2 = (\text{var}_{win} + e_2)/(\text{var}_{win_{mean}} + e_2),$$

$$a = \text{var}_{win}/(\text{var}_{win} + eps_2/tau_2), \text{ and}$$

$$b = T_2 - a$$

where $eps_2$ (e.g., $eps_2=50$) is a parameter that is used to control the filtering strength, $T_2$ (e.g., $T_2=1$) is a parameter that is used to control the weights, and $e_2$ (e.g., $e_2=10$) is a parameter that controls the adaptability of the filter.

In one example, the weights used in filtering may be computed as follows:

$$tau_3 = (\text{var}_{win} + e_3)/(\text{var}_{win_{mean}} + e_3),$$

$$eta_3 = k_3/(\text{var}_{win_{mean}} - \text{var}_{win_{min}}),$$

-continued $$\text{gamma}_3 = 1 - \frac{T_3}{1 + e^{eta_3 \times (\text{var}_{win} - \text{var}_{win_{mean}})}},$$

$$a = \frac{\text{var}_{win} + \frac{eps_3}{tau_3} \times \text{gamma}_3}{\text{var}_{win} + \frac{eps_3}{tau_3}}, \text{ and}$$

$$b = T_4 - a$$

where $eps_3$ (e.g., $eps_3=50$) is a parameter that is used to control the filtering strength, $T_3$ (e.g., $T_3=1$) and $T_4$ (e.g., $T_4=1$) are two parameters, $e_3$ (e.g., $e_3=10$) is a parameter that controls the adaptability of the filter, and $k_3$ (e.g., $k_3=128$) is also a parameter that is used to control the filtering strength. The $\text{var}_{win_{mean}}$ and $\text{var}_{win_{min}}$ stand for the mean value and min value of all the window variance inside the video unit.

In one example, the parameters may be pre-defined, searched, determined on-the-fly or signaled in the bitstream. In one example, the parameters may be set based on coding mode, size, or other coded information of current video unit. In one example, the parameters may be signaled from the encoder to the decoder, such as in syntax for color component, sequence, picture, sub-picture, slice, tile, CTU, CTU row, groups of CTU, CU, PU, TU, CTB, CB, PB, transform block (TB), and/or any other region that contains more than one sample or pixel.

In one example, the coefficients a and b mentioned above may be refined as follows:

$$a_{refine} = \sum_{i=0}^{i=total-1} a_i/s_{total}$$

$$b_{refine} = \sum_{i=0}^{i=total-1} b_i/s_{total}$$

where $a_i$ and $b_i$ are specific coefficients within a window, and $S_{total}$ is the total sample number inside the video unit. The window used may or may not have the same shape with the window used in computation of window variance and mean.

In one example, the filtering result may be computed as a weighted summation within the filter shape as follows:

$$\text{sample}_{filtered} = \sum_{j=0}^{j=K_{total}-1} w_{shape_j} \times p_j$$

where $K_{total}$ represents the total number of samples inside the filter shape, $p_j$ is the sample/pixel located at position j inside the filter shape, and $w_{shape_j}$ represents the corresponding weight.

In one example, the weights may be computed based on the gradient information within the filter shape. In one example, the weights may be computed based on the variance within the filter shape. In one example, the weights may be computed based on the mean value within the filter shape. In one example, the filtering result generated within a window and the filtering result generated within a filter shape may be used individually. In an example, the filtering result generated within a window and the filtering result generated within a filter shape may be used jointly. In one example, the samples that are filtered by the guided filter may be used to update the reconstruction samples and/or residuals of a video unit.

In one example, a video unit may be padded before and/or after the filtering process. In one example, the video unit may be padded at boundary positions by $N_{pad}$ (e.g., $N_{pad}=2$) samples. In one example, whether to pad and/or how to pad the samples/pixels may depend on whether the neighboring samples/pixels have been decoded. In one example, when the neighboring samples/pixels have been decoded, the neighboring samples/pixels may be padded using the decoded neighboring samples/pixels. In an example, when the neighboring samples/pixels have not been decoded, a pre-defined value may be used to pad. In one example, extending and/or minoring padding may be used. In this case, the padding samples/pixels are from the current video unit and not from neighboring samples/pixels.

Figure 5:
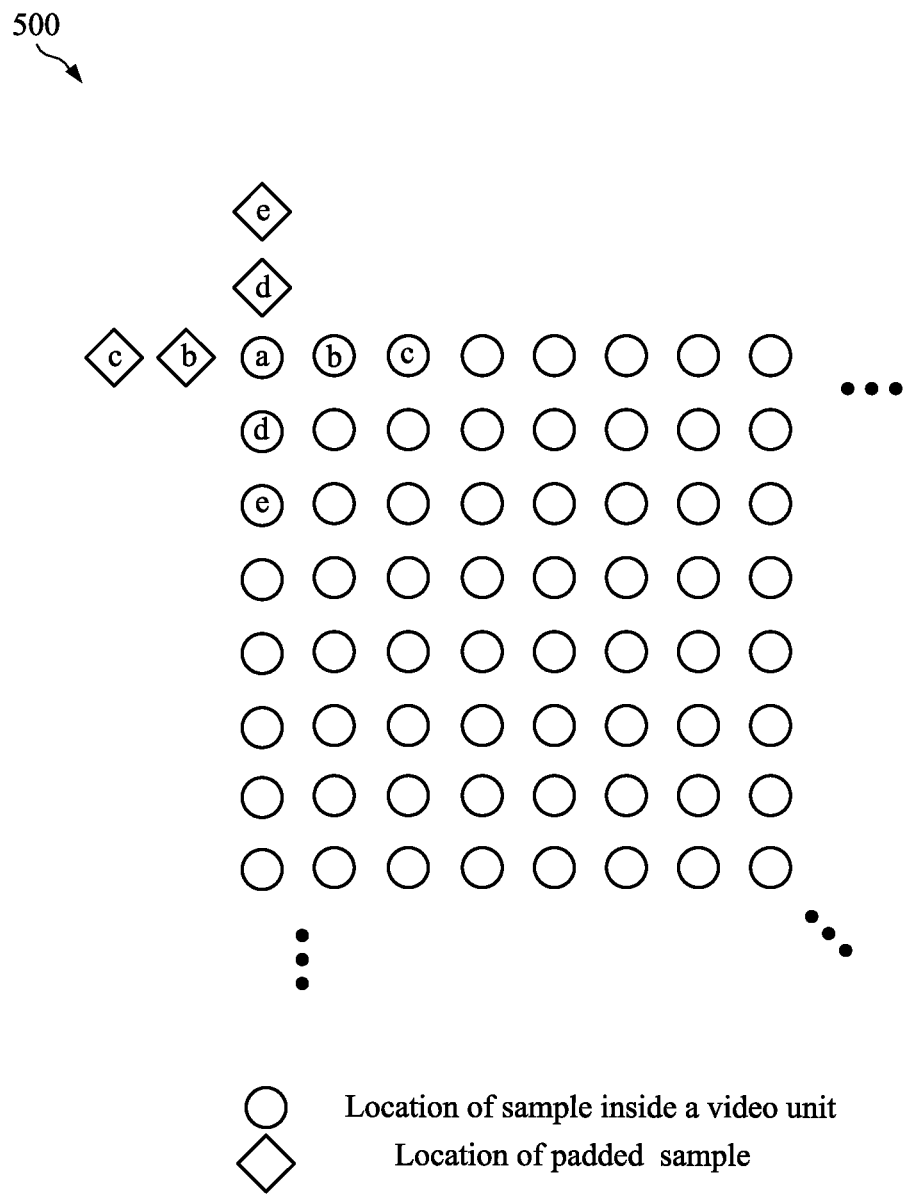
FIG. 5 is a schematic diagram of an example mechanism for minor padding.

FIG. 5 is a schematic diagram 500 of an example mechanism for mirror padding. In diagram 500, the circles depict samples inside a video unit and squares depict padded samples outside the video unit. As shown, the padded samples b, c, d, and e outside the video unit are generated based on the sample b, c, d, and e inside the video unit. Accordingly, the boundary samples of the video unit may be padded by a mirroring function as shown in diagram 500 in one example.

Figure 6:
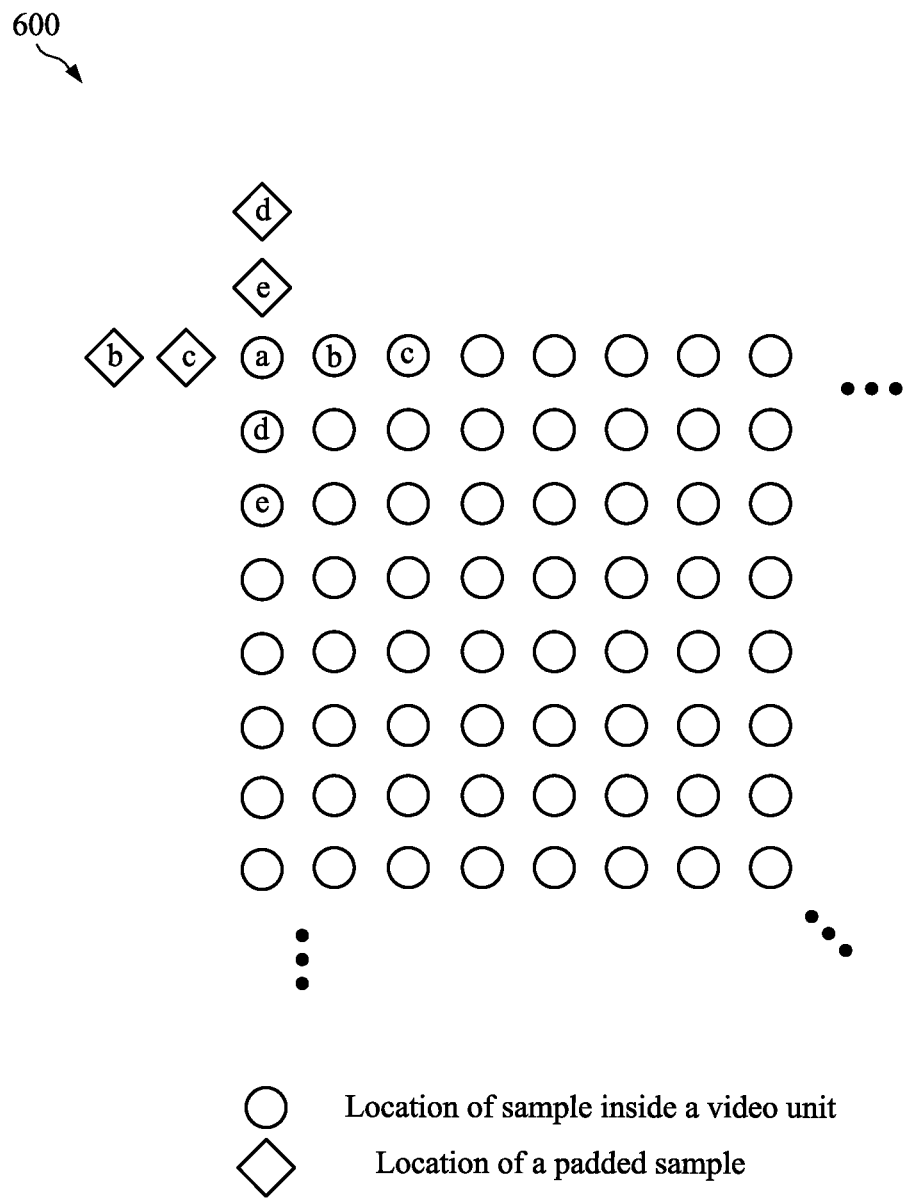
FIG. 6 is a schematic diagram of an example mechanism for extended padding.

FIG. 6 is a schematic diagram 600 of an example mechanism for extended padding. In diagram 600, the circles depict samples inside a video unit and squares depict padded samples outside the video unit. As shown the padded samples b, c, d, and e outside the video unit are generated based on the sample b, c, d, and e inside the video unit. The difference between diagram 500 and diagram 600 is that in diagram 500 samples are mirrored around sample a, while in diagram 600 the samples are copied from one side of sample a and included in the same order on the other side of sample a. Accordingly, the boundary sample of the video unit may be padded by extending function in an example.

In an example, the padded samples may be used in the filtering process. Further, the samples filtered by the filtering process may be used to pad samples.

EXAMPLE 2

In one example, filtering in the guided filter may be performed at subblock-level. In one example, the mean and variance may be shared by a subblock (e.g., 2×2/1×2/2×1). In an example, the filtered results of a first subblock may be used to filter samples of a second subblock. In an example, unfiltered samples of a first subblock may be used to filter samples of a second subblock.

EXAMPLE 3

In one example, the guided filter may be performed at different stages in the video codec coding flow. In one example, the guided filter may be used at the loop-filtering stage. In one example, the guided filter may be performed before or after the DF. In one example, the guided filter may be performed before or after the SAO filter. In one example, the guided filter may be performed before or after the ALF. In one example, the guided filter may be performed before or after the BF. In one example, the guided filter may be performed before or after other loop filters. In one example, the guided filter may be performed as a post-processing filter that filters the samples/pixels after the decoding is finished.

In one example, a first filtering stage (e.g., the guided filter) may be performed independently with respect to a second filtering process (e.g., SAO, ALF, BF or other loop filters). For example, the first and second filter may be applied on the same input samples, producing a first offset and a second offset. An output sample may be derived based on both the first and second offset. The output sample may be clipped. The output sample may be further processed by a next stage. In one example, the guided filter may be applied on the prediction samples before generating the reconstruction samples at decoder. In one example, the guided filter may be applied on the reconstructed samples of a coding block, which may be used to predict succeeding samples or blocks.

EXAMPLE 4

In one example, the video units or samples may be classified into multiple groups and one or more parameters associated with a group may be used. In one example, video units within a higher-level video region may be classified into $N_{unit}$ groups by the coded/statistical information (e.g., mean/variance/block dimensions) of the video units. In one example, the guided filter may have different parameters on video units of different classes. In one example, the coded and/or statistical information of the video unit may be used in video unit classification. In one example, the mean of the input block may be used in unit classification. For example, the unit mean value may be computed by:

$$S = w_{unit} \times h_{unit}$$

$$\text{mean}_{unit} = \left( \sum_{i=0}^{i=S-1} p_i \right) / S$$

where $p_i$ is the sample located at i position inside the video unit, $w_{unit}$ and $h_{unit}$ are width and height of the video unit respectively.

In one example, the variance of the video unit may be used in unit classification. The unit variance may be computed by:

$$\text{corr}_{unit} = \left( \sum_{i=0}^{i=S-1} p_i \times p_i \right) / S$$

$$\text{var}_{unit} = \text{corr}_{unit} - \text{mean}^2_{unit}$$

In one example, a fixed threshold value $T_{unit\_class}$ (e.g., $T_{unit\_class}=1024$) may be used to compute the class index of the video unit based on the unit variance. The unit mean value or other statistical information is as follows:

$$\text{index}_{unit} = \lfloor \text{info}_{unit} / T_{block\_class} \rfloor$$

where $0 \leq \text{index}_{unit} < N_{unit}$ and $\text{info}_{unit}$ are the corresponding statistical information.

In one example, a set of threshold value $[T_1, T_2, \ldots T_{N-1}]$ may be used to classify the video unit based on the unit variance, the unit mean value, or other statistical information as follows:

$$\text{index}_{unit} = 0 \text{ when } (0 \leq \text{info}_{unit} < T_1)$$
$$\ldots$$
$$\text{index}_{unit} = N_{unit} - 2 \text{ when } (T_{N-2} \leq \text{info}_{unit} < T_{N-1})$$
$$\text{index}_{unit} = N_{unit} - 1 \text{ when } (T_{N-1} \leq \text{info}_{unit})$$

where $0 \leq \text{index}_{unit} < N_{unit}$ and $\text{info}_{unit}$ stands for the corresponding statistical information.

In one example, the width or height of the video unit may be used in block classification individually.

In one example, the width and height of the video unit may be used in block classification jointly. In one example, the video unit may be a CTU, CTB, CU, and/or CB. In one example, the higher-level video region may be a slice, subpicture, tile, brick, picture, and/or sequence. In one example, the samples inside the video unit may be classified into $N_{sample}$ groups. In one example, the guided filter may have different parameters on samples of different classes in a video unit. In one example, the coded/statistical information within a window may be used in a sample/pixel classification. In one example, the coded/statistical information used in the sample classification may be the mean value within a window. In one example, the coded/statistical information used in the sample classification may be the variance within a window. In one example, the coded/statistical information used in the sample classification may be the gradient information within a window. In one example, the gradient information may be the minimum of the gradient within a window. In one example, the gradient information may be the maximum of the gradient within a window. In one example, the gradient information may be the mean of the gradient within a window. In one example, the window shape may be a square. In one example, the window shape may be a diamond. In one example, the window shape may be a cross. In one example, the window shape may be symmetrical. In one example, the window shape may be asymmetrical. In one example, the video unit may be a CTU, CTB, CU, and/or CB.

EXAMPLE 5

In one example, whether to apply and/or how to apply the guided filter for a video unit or a sample/pixel within a video unit may depend on the coded information or determined on-the-fly. In one example, the coded information may refer to the transform coefficients in the video unit. In one example, the guided filter may be applied when the video unit has one or more transform coefficient levels not equal to 0, such as when the coded block flag (CBF) of the current video unit is equal to 1. In one example, the guided filter may be disallowed when the video unit has all zero transform coefficient levels, such as when the CBF of the current video unit is equal to 0. In one example, the coded information may refer to the color component and/or color format of the video unit. In one example, the guided filter may be applied when the component of current video unit is Y, Cb, and/or Cr in YCbCr format. In one example, the guided filter may be applied when the component of current video unit is G, B, and/or R in RGB format. In one example, the coded information may refer to QP. In one example, the guided filter may be applied when the QP of current video unit is larger than $T_{QP}$ (e.g., $T_{QP}=17$).

In one example, the coded information may refer to the dimension and/or size of the video unit. In one example, the guided filter may be applied when the min of width and height of current video unit is smaller or larger than $T_{size\_min}$ (e.g., $T_{size\_min}=32$). In one example, the guided filter may be applied when the max of the width and height of current video unit is smaller or larger than $T_{size\_max}$ (e.g., $T_{size\_max}=128$). In one example, the guided filter may be applied when both the width and height of the current video unit are smaller or larger than $T_{size\_both}$ (e.g., $T_{size\_both}=16$). In one example, the coded information may refer to the number of samples/pixels in the video unit. In one example, the guided filter may be applied when the number of samples inside the video unit multiplied by a factor $F_{num}$ (e.g., $F_{num}=1$, 2 or 4) is larger than or less than or equal to $T_{num}$, (e.g., $T_{num}=64$). In one example, the coded information may refer to any coding mode or information such as inter prediction mode, intra prediction mode, merge flag, merge index, affine flag, motion vector, reference index, etc. In one example, for two samples/pixels in a video unit, one of them may be filtered by the guided filter and the other is not.

EXAMPLE 6

In one example, whether to use and/or how to use the guided filter for a video unit may be signaled to the decoder using one or more syntax elements. In one example, one or more syntax elements may be signaled at VPS, SPS, PPS, picture, subpicture, slice, tile, slice group, tile group, CTU, CU, PU, TU, CTB, CB, PB, TB, and/or other levels. In one example, a slice level syntax element may be signaled to the decoder side. The slice level syntax element may be determined by the RDO operation. In an example, the slice level syntax element may decide whether the in-loop filter is applied for the video blocks inside the slice.

In one example, a CTU level syntax element may be signaled to the decoder side. The CTU level syntax element may be determined by the RDO operation. The CTU level syntax element may decide whether the in-loop filter is applied for the video blocks inside the CTU. In one example, a CU level syntax element may be signaled to the decoder side. In one example, the CU level syntax element may be determined by the RDO operation. In one example, the CU level syntax element may be set to false at the CU initial process. In one example, the CU level syntax element may not be signaled at the encoder side and may be set to false at the decoder side when the channel type of current CU is not equal to luma. In one example, the CU level syntax element may not be signaled at the encoder side and may be set to false at the decoder side when the QP of current CU is smaller than a threshold value $T_{CUQP}$ (e.g., $T_{CUQP}=17$). In one example, the CU level syntax element may not be signaled at the encoder side and may be set to false at the decoder side when the max of the width and height of current CU is not smaller than a threshold value $T_{CUmax}$ (e.g., $T_{CUmax}=128$). In one example, the CU level syntax element may not be signaled at the encoder side and may be set to false at the decoder side when the min of the width and height of current CU is not smaller than a threshold value $T_{CUmin}$ (e.g., $T_{CUmin}=32$). In one example, the CU level syntax element may not be signaled at the encoder side and may be set to false at the decoder side when both of the width and height of current CU is not smaller or not larger than a threshold value $T_{CUboth}$ (e.g., $T_{CUboth}=16$).

In one example, a TU level syntax element may be signaled to the decoder side. In one example, the TU level syntax element may be determined by the RDO operation. In one example, the TU level syntax element may be set to false at TU initial process. In one example, the TU level syntax element may not be signaled at the encoder side and may be set to false at the decoder side when the channel type of current TU is not equal to luma. In one example, the TU level syntax element may not be signaled at the encoder side and may be set to false at the decoder side when the QP of current TU is smaller than a threshold value $T_{TUQP}$ (e.g., $T_{TUQP}=17$). In one example, the TU level syntax element may not be signaled at the encoder side and may be set to false at the decoder side when the CBF of current TU is equal to false. In one example, the TU level syntax element may not be signaled at the encoder side and may be set to false at the decoder side when the max of the width and height of current TU is not smaller than a threshold value $T_{TUmax}$ (e.g., $T_{TUmax}$=128). In one example, the TU level syntax element may not be signaled at the encoder side and may be set to false at the decoder side when the min of the width and height of current TU is not smaller than a threshold value $T_{TUmin}$ (e.g., $T_{TUmin}$=32). In one example, the TU level syntax element may not be signaled at the encoder side and may be set to false at the decoder side when both of the width and height of current TU is not smaller or not larger than a threshold value $T_{TUboth}$ (e.g., $T_{TUboth}$=16). In one example, the syntax elements may be coded by a bypass-based method. In one example, the syntax elements may be coded by a context-based method.

EXAMPLE 7

In one example, whether to and/or how to apply the disclosed methods above may be signaled at sequence level, group of pictures level, picture level, slice level, and/or tile group level, such as in sequence header, picture header, SPS, VPS, DPS, decoding capability information (DCI), PPS, adaptation parameter set (APS), slice header, and/or tile group header.

EXAMPLE 8

In one example, whether to and/or how to apply the disclosed methods above may be signaled at PB, TB, CB, PU, TU, CU, virtual pipeline data unit (VPDU), CTU, CTU row, slice, tile, sub-picture, or other regions containing more than one sample or pixel.

EXAMPLE 9

In one example, whether to and/or how to apply the disclosed methods above may be dependent on coded information, such as block size, color format, single/dual tree partitioning, color component, slice/picture type.

Figure 7:
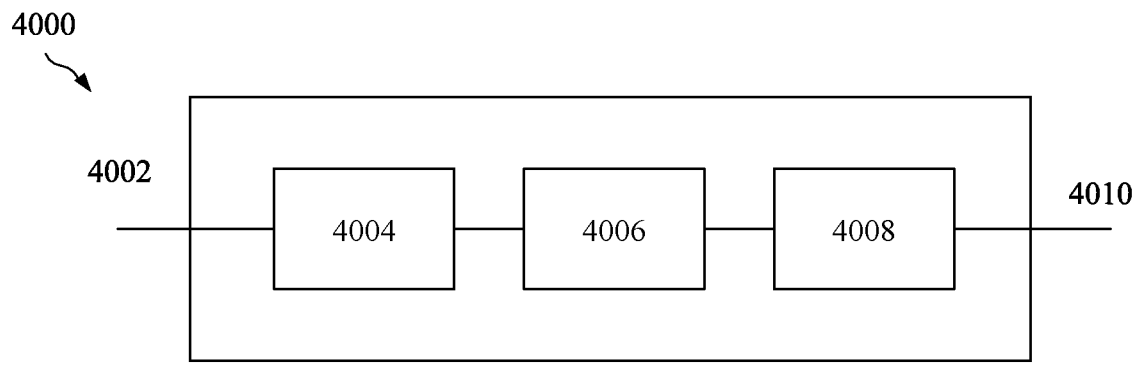
FIG. 7 is a block diagram showing an example video processing system.

FIG. 7 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 8:
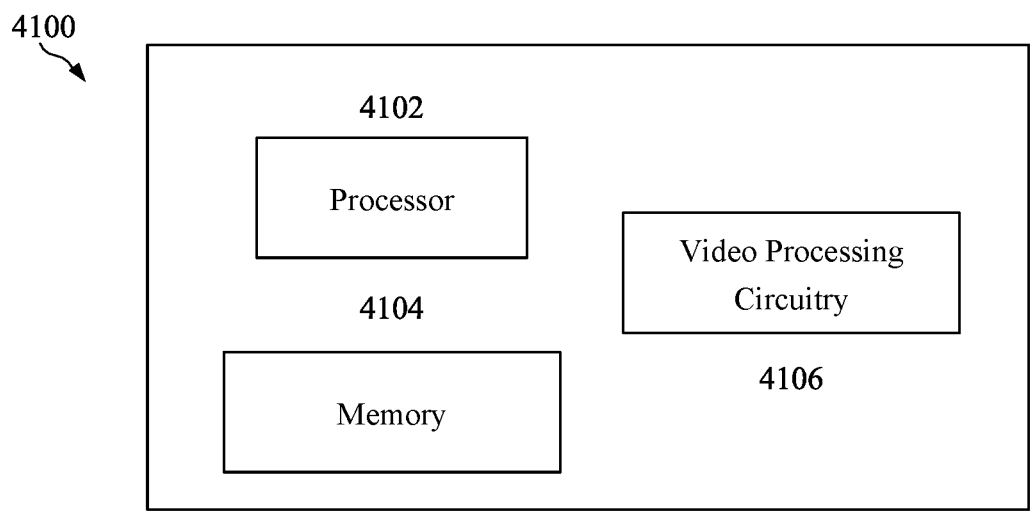
FIG. 8 is a block diagram of an example video processing apparatus.

FIG. 8 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and techniques described herein. The video processing circuitry 4106 may be used to implement, in hardware circuitry, some techniques described in the present disclosure. In some embodiments, the video processing circuitry 4106 may be at least partly included in the processor 4102, e.g., a graphics co-processor.

Figure 9:
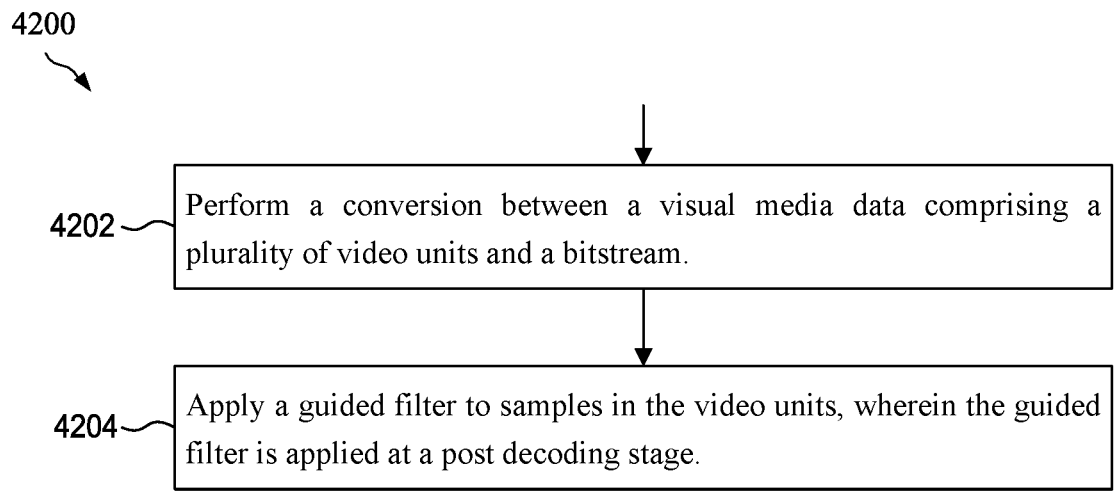
FIG. 9 is a flowchart for an example method of video processing.

FIG. 9 is a flowchart for an example method 4200 of video processing. The method 4200 includes performing a conversion between a visual media data comprising a plurality of video units and a bitstream at step 4202. When the method 4200 is performed on an encoder, the conversion comprises generating the bitstream according to the visual media data. The conversion includes encoding video units into the bitstream. The video units encoded into the bitstream are then reconstructed for use as reference video units for encoding of subsequent video units. When the method 4200 is performed on a decoder, the conversion comprises parsing and decoding the bitstream to obtain the video units in the visual media data. In either case, a guided filter is applied to samples in the video units at step 4204. The guided filter is applied at a post decoding stage.

For example, the guided filter of step 4204 can be applied to prediction samples prior to reconstruction by application of residual data. In another example, the guided filter can be applied to reconstructed samples, for example in post processing. In another example, the guided filter can be applied as part of an in-loop filter. In another example, the guided filter is applied prior to a deblocking filter in an in-loop filter. In another example, the guided filter is applied after a deblocking filter and prior to a SAO filter in an in-loop filter. In another example, the guided filter is applied after a SAO filter and prior to an ALF in an in-loop filter. In another example, the guided filter is applied prior to a BF and in parallel with a SAO filter in an in-loop filter.

In an example, the guided filter of step 4204 may classify the video units into a plurality of video unit groups and apply different parameters to samples in each of the video unit groups. For example, the guided filter may classify the video units into the plurality of video unit groups based on statistical information related to each of the video units. In an example, the statistical information includes a unit mean of the video unit, a variance of the video unit, a comparison of video unit values to a threshold, a dimension of the video unit, or combinations thereof. For example, the video unit may be a CTU, a CTB, a CU, or a CB.

In an example, a video unit can be classified into a group based on a unit mean value determined according to:

$$S = w_{unit} \times h_{unit}$$

$$mean_{unit} = \left(\sum_{i=0}^{i=S-1} p_i\right)/S$$

where $p_i$ is the sample located at i position inside the video unit, s is video unit size, $w_{unit}$ and $h_{unit}$ stand for width and height of the video unit, respectively, and $mean_{unit}$ is the unit mean value.

In an example, a video unit can be classified into a group based on unit variance determined according to:

$$corr_{unit} = \left(\sum_{i=0}^{i=S-1} p_i \times p_i\right)/S$$

$$var_{unit} = corr_{unit} - mean_{unit}^2$$

where $p_i$ is the sample located at i position inside the video unit, s is video unit size, $corr_{unit}$ and $mean_{unit}$ stand for unit correspondence and mean unit value, respectively, and $var_{unit}$ is unit variance.

In an example, a video unit can be classified into a group based on a fixed threshold value determined according to:

$$index_{unit} = \lfloor info_{unit}/T_{block\_class}\rfloor$$

where $0 \leq index_{unit}$, $info_{unit}$ stands for the corresponding statistical information, and $T_{block\_class}$ is the threshold.

In an example, a video unit can be classified into a group based on a plurality of fixed threshold values determined according to:

$$index_{unit} = 0 \text{ when } (0 \leq info_{unit} < T_1)$$
...
$$index_{unit} = N_{unit} - 2 \text{ when } (T_{N-2} \leq info_{unit} < T_{N-1})$$
$$index_{unit} = N_{unit} - 1 \text{ when } (T_{N-1} \leq info_{unit})$$

where $0 \leq index_{unit} < N_{unit}$, $info_{unit}$ stands for the corresponding statistical information, and $T_N$ is a series of N thresholds.

In an example, the guided filter of step 4204 may classify the samples into a plurality of sample groups and apply different parameters to samples in each of the sample groups. For example, the guided filter may employ a window. The guided filter can then classify the samples into the plurality of sample groups based on statistical information related to samples within the window. In an example, the statistical information includes a mean value of samples within the window, a variance of samples within the window, a gradient within the window, or combinations thereof.

In an example, the guided filter comprises a window shape. The window shape can be a square, a cross, a diamond, a symmetrical shape, an asymmetrical shape, or combinations thereof.

In an example, the bitstream comprises a syntax element describing a usage of the guided filter. For example, the syntax element can be set at an encoder during an RDO, for example based on: slice data, CTU data, CU data, TU data, or combinations thereof. In an example, the syntax element can be located in a sequence header, a picture header, a sequence parameter set, a video parameter set, decoding parameter set, a decoding capability information, a picture parameter set, an adaptation parameter set, a slice header, a tile group header, or combinations thereof. In another example, the syntax element can be located in a PB, a TB, a CB, a PU, a TU, a CU, a VPDU, a CTU, a CTU row, a slice, a tile, a subpicture, or combinations thereof. In an example, the guided filter can be allowed or disallowed for each video unit based on coded information for a corresponding video unit. The coded information can include a block size, a color format, a tree partitioning, color component, a slice type, a picture type, or combinations thereof.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 10:
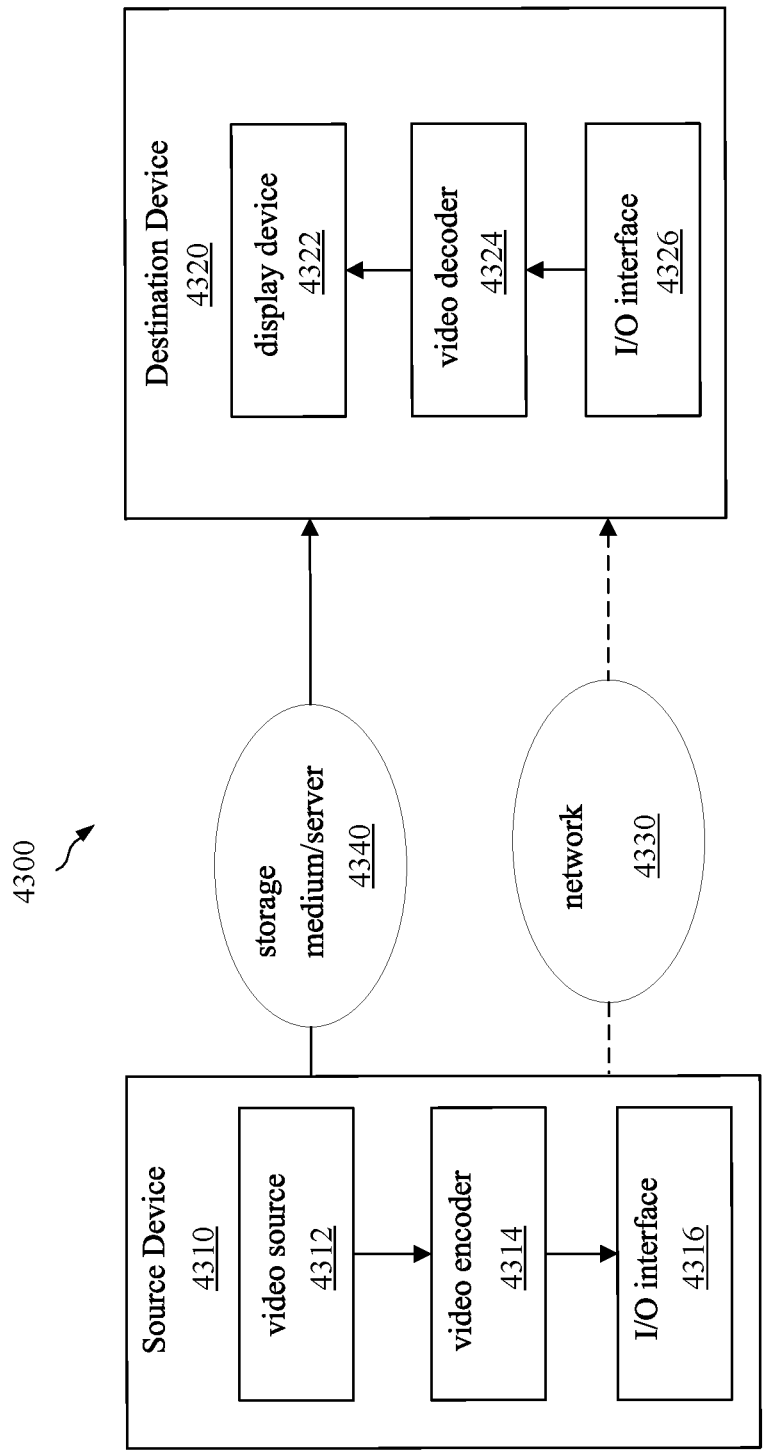
FIG. 10 is a block diagram that illustrates an example video coding system.

FIG. 10 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/ server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 11:
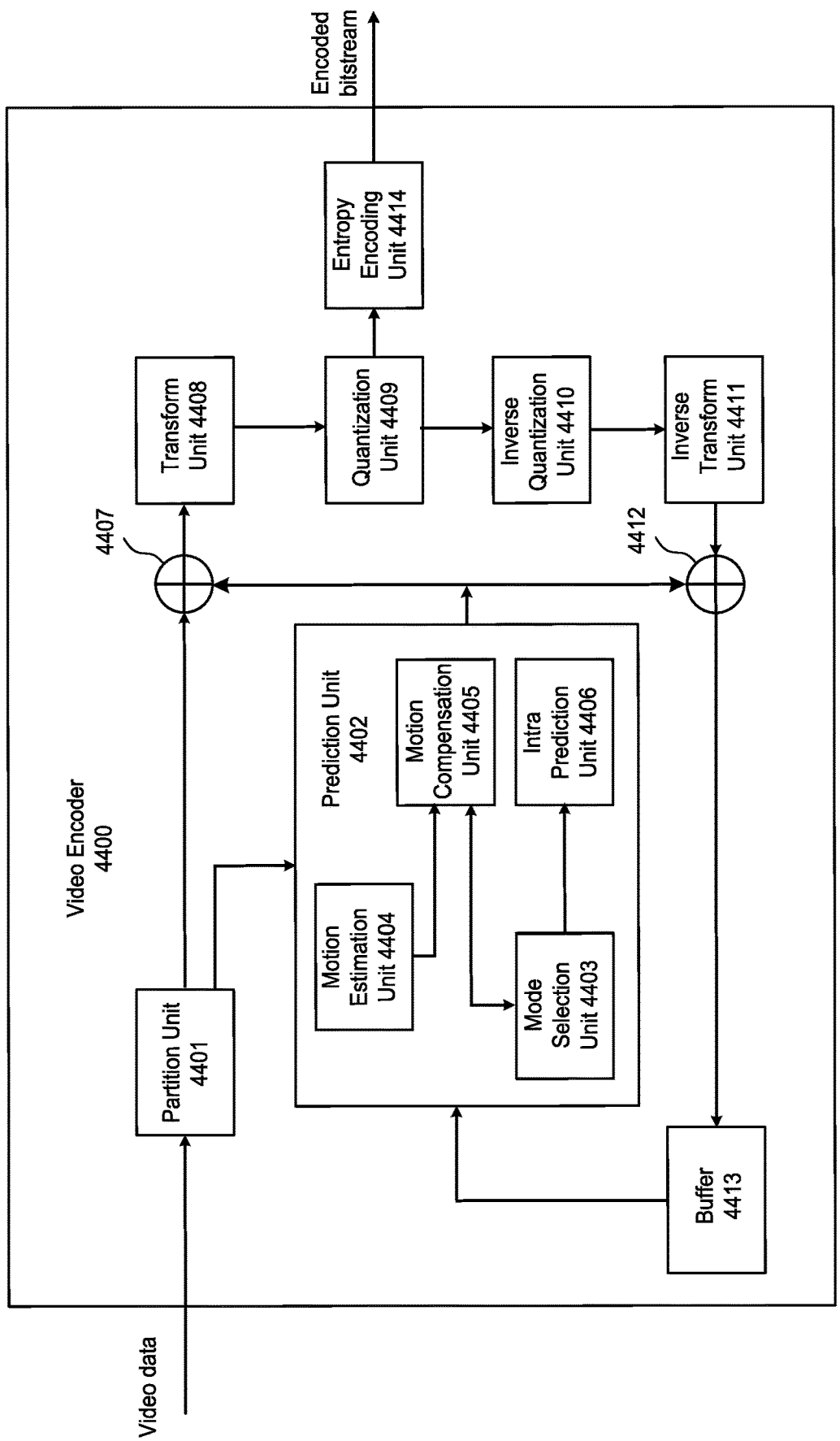
FIG. 11 is a block diagram that illustrates an example encoder.

FIG. 11 is a block diagram illustrating an example of video encoder 4400, which may be video encoder 4314 in the system 4300 illustrated in FIG. 10. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 12:
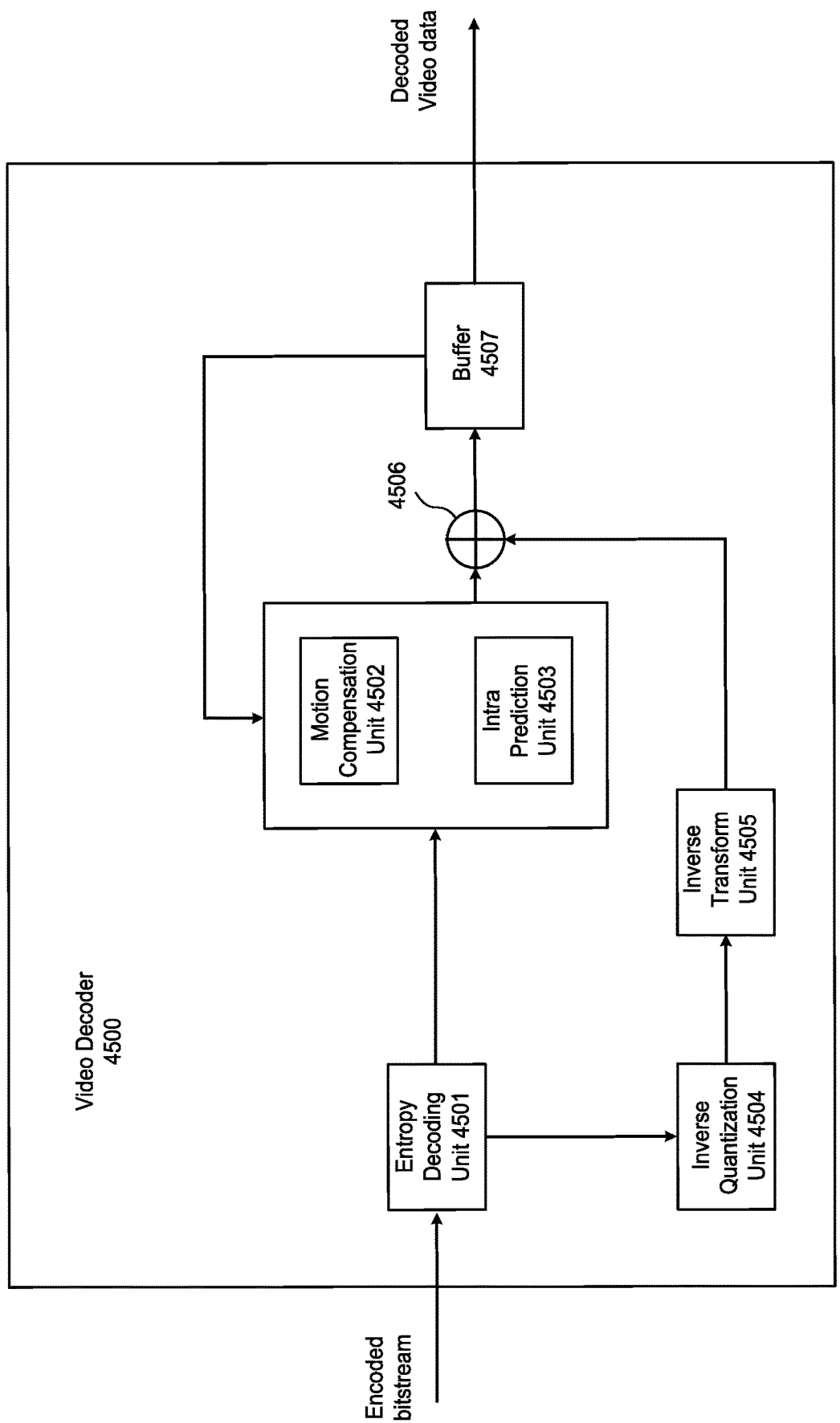
FIG. 12 is a block diagram that illustrates an example decoder.

FIG. 12 is a block diagram illustrating an example of video decoder 4500 which may be video decoder 4324 in the system 4300 illustrated in FIG. 10. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400 as shown in FIG. 11.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

FIG. 13 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of techniques discussed herein.

1. A method of video processing (e.g., method 4200 shown in FIG. 9), comprising: determining, during a conversion between a video unit of a video and a bitstream of the video, an intermediate video unit corresponding to the video unit; and applying a guided filter to filter at least some samples of the reconstructed video unit selectively based on a rule.
2. The method of solution 1, wherein the intermediate video unit is a reconstructed video unit corresponding to the video unit.
3. The method of solution 1, wherein the intermediate video unit is a prediction unit corresponding to the video unit.
4. The method of solution 1, wherein the rule is responsive to a coded or statistical information of a video region that contains the at least some samples of the intermediate video unit.
5. The method of solutions 1-4, wherein the rule specifies a filter shape of the guided filter.
6. The method of any of solutions 1-5, wherein coded or statistical information of the intermediate video unit is used to generate output of the applying the guided filter.
7. The method of any of solutions 1-5, wherein the rule specifies that samples of the video are padded prior to applying the guided filter.
8. The method of any of solutions 1-7, wherein the rule specifies that the guided filter is applied at sub-block level of the video unit.
9. The method of solution 8, wherein the rule specifies that filtered samples of a first subblock are used for filtering samples of a second subblock.
10. The method of any of solutions 1-9, wherein the rule specifies that the guided filter is applied during in-loop filtering of the intermediate video unit.
11. The method of any of solutions 1-10, wherein the rule specifies that the guided filter is responsive to a parameter of a group of video units, wherein the video is classified into multiple groups of video units according to a criterion.
12. The method of solution 11, wherein the rule specifies to use coded or statistical information of a group of a higher-level video region.
13. The method of solution 11, wherein the rule specifies that samples in the video unit are classified into N sample groups.
14. The method of solution 13, wherein the classification is based on a windowing of the samples.
15. The method of solution 14, wherein the windowing uses a window that is a square or a diamond or a cross.
16. The method of solution 14, wherein the windowing uses a window that is asymmetrical.
17. The method of solution 1, wherein the rule specifies how to apply the guided filter or which samples to filter by the guided filter according to a coding information or using a non-predetermined decision taken during the conversion.
18. The method of solution 17, wherein the coded information is based on transform coefficients of the video unit.
19. The method of any of solutions 17-18, wherein the coded information includes a color component identity of the video unit.
20. The method of any of solutions 17-19, wherein the coded information includes a quantization parameter for the video unit or dimensions of the video unit or a number of samples of the video unit or a coding mode of the video unit or a neighboring unit of the video unit.
21. The method of any of solutions 1-20, wherein the rule further specifies that a syntax element indicates whether or how the guided filter is applied to the video unit.
22. The method of solution 21, wherein the syntax element is a slice level syntax element.
23. The method of solution 21, wherein the syntax element is a coding tree unit level syntax element.
24. The method of solution 21, wherein the syntax element is a transform unit or a prediction unit level syntax element.
25. The method of any of the above solutions, wherein the rule specifies indication at a sequence level or a group of pictures level or a picture level or a slice level or a tile group level.
26. The method of any of the above solutions, wherein the rule specifies indication in such as in sequence header or a picture header or a slice header or a tile group header.
27. The method of any of the above solutions, wherein the rule specifies indication in a parameter set, wherein the parameter set is a sequence parameter set or a video parameter set or a decoding parameter set or decoding control information or a picture parameter set or an adaptation parameter set.
28. The method of any of solutions 1-24, wherein the rule specifies indication that is dependent on a block size, a color format a slice type or a picture type of a color component or a partitioning type of the video unit.
29. The method of any of solutions 1-28, wherein the video unit is a transform block or a prediction block or a coding block or a coding tree unit or a virtual pipeline data unit or a coding tree unit row or a slice or a tile or a subpicture.
30. The method of any of solutions 1-29, wherein the conversion comprises generating the video from the bitstream.
31. The method of any of solutions 1-30, wherein the conversion comprises generating the bitstream from the video.
32. A method of storing a bitstream on a computer-readable medium, comprising generating a bitstream according to a method recited in any one or more of solutions 1-31 and storing the bitstream on the computer-readable medium.

33. A computer-readable medium having a bitstream of a video stored thereon, the bitstream, when processed by a processor of a video decoder, causing the video decoder to generate the video, wherein the bitstream is generated according to a method recited in one or more of solutions 1-31.

34. A video decoding apparatus comprising a processor configured to implement a method recited in one or more of solutions 1 to 31.

35. A video encoding apparatus comprising a processor configured to implement a method recited in one or more of solutions 1 to 31.

36. A computer program product having computer code stored thereon, the code, when executed by a processor, causes the processor to implement a method recited in any of solutions 1 to 31.

37. A computer readable medium on which a bitstream complying to a bitstream format that is generated according to any of solutions 1 to 31.

38. A method, an apparatus, a bitstream generated according to a disclosed method or a system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:
    performing a conversion between a visual media data comprising a plurality of video units and a bitstream of the visual media data according to a rule,
    wherein the rule specifies that a first filter is conditionally applied to the plurality of video units, and wherein the first filter modifies samples of the plurality of video units by applying a statistical computation, and
    wherein the first filter classifies the plurality of video units into a plurality of video unit groups and applies different parameters to the samples in each of the plurality of video unit groups, and wherein the plurality of video units are classified based on a variance value of the plurality of video units.

2. The method of claim 1, wherein the first filter is applied as part of an in-loop filter, and wherein the first filter is applied before or after a deblocking filter.

3. The method of claim 1, wherein the first filter is applied as part of an in-loop filter, and wherein the first filter is applied before or after an adaptive loop filter (ALF).

4. The method of claim 1, wherein the first filter is applied independently with a second filter different from the first filter,
    wherein the second filter is a sample adaptive offset (SAO) filter, an adaptive loop filter (ALF) or a bilateral filter (BF).

5. The method of claim 4, wherein the first filter and the second filter are applied on same input samples to generate a first offset and a second offset,
    wherein an output sample of the same input samples is derived based on both the first offset and the second offset, and
    wherein the output sample is processed by a third filter.

6. The method of claim 1, wherein a fixed threshold value $T_{unit\_class}$ is used to compute a class index of a video unit based on the variance value.

7. The method of claim 1, wherein the rule further specifies that a first syntax element is included at a slice level of the bitstream for indicating whether the first filter is applied for a slice, and
    wherein the first syntax element is determined by a rate distortion optimization (RDO) operation.

8. The method of claim 1, wherein the rule further specifies that a second syntax element is included at a CTU level of the bitstream for indicating whether the first filter is applied for a CTU, and
    wherein the second syntax element is determined by a rate distortion optimization (RDO) operation.

9. The method of claim 1, wherein the rule further specifies that a third syntax element is included at a CU level of the bitstream for indicating whether the first filter is applied for a CU, and
    wherein the third syntax element is determined by a rate distortion optimization (RDO) operation.

10. The method of claim 9, wherein the rule further specifies that the third syntax element is not included at the CU level when a quantization parameter of the CU is smaller than a threshold value $T_{CUQP}$.

11. The method of claim 9, wherein the rule further specifies that the third syntax element is not included at the CU level when a max of a width and a height of the CU is not smaller than a threshold value $T_{CUmax}$.

12. The method of claim 9, wherein the rule further specifies that the third syntax element is not included at the CU level when a minimum of a width and a height of the CU is not smaller than a threshold value $T_{CUmin}$.

13. The method of claim 1, wherein the rule further specifies that a fourth syntax element is included at a TU level of the bitstream for indicating whether the first filter is applied for a TU, and
    wherein the fourth syntax element is determined by a rate distortion optimization (RDO) operation.

14. The method of claim 13, wherein the rule further specifies that the fourth syntax element is not included at the TU level when a maximum of a width and a height of the TU is not smaller than a threshold value $T_{TUmax}$, or wherein the fourth syntax element is not included at the TU level when a minimum of the width and the height of the TU is not smaller than a threshold value $T_{TUmin}$.

15. The method of claim 1, wherein the conversion includes encoding the plurality of video units into the bitstream.

16. The method of claim 1, wherein the conversion includes decoding the plurality of video units from the bitstream.

17. An apparatus for processing video data comprising a processor and a non-transitory memory with instructions thereon, wherein the instructions upon execution by the processor, cause the processor to:

perform a conversion between a visual media data comprising a plurality of video units and a bitstream of the visual media data according to a rule, wherein the rule specifies that a first filter is conditionally applied to the plurality of video units, and wherein the first filter modifies samples of the plurality of video units by applying a statistical computation, and wherein the first filter classifies the plurality of video units into a plurality of video unit groups and applies different parameters to the samples in each of the plurality of video unit groups, and wherein the plurality of video units are classified based on a variance value of the plurality of video units.

18. A non-transitory computer-readable storage medium storing instructions that cause a processor to:

perform a conversion between a visual media data comprising a plurality of video units and a bitstream of the visual media data according to a rule, wherein the rule specifies that a first filter is conditionally applied to the plurality of video units, and wherein the first filter modifies samples of the plurality of video units by applying a statistical computation, and wherein the first filter classifies the plurality of video units into a plurality of video unit groups and applies different parameters to the samples in each of the plurality of video unit groups, and wherein the plurality of video units are classified based on a variance value of the plurality of video units.

19. A non-transitory computer-readable recording medium storing a bitstream of a visual media data which is generated by a method performed by a video processing apparatus, wherein the method comprises:

generating the bitstream according to a rule, wherein the rule specifies that a first filter is conditionally applied to a plurality of video units of the visual media data, and wherein the first filter modifies samples of the plurality of video units by applying a statistical computation, and wherein the first filter classifies the plurality of video units into a plurality of video unit groups and applies different parameters to the samples in each of the plurality of video unit groups, and wherein the plurality of video units are classified based on a variance value of the plurality of video units.

* * * * *